Figure 3:
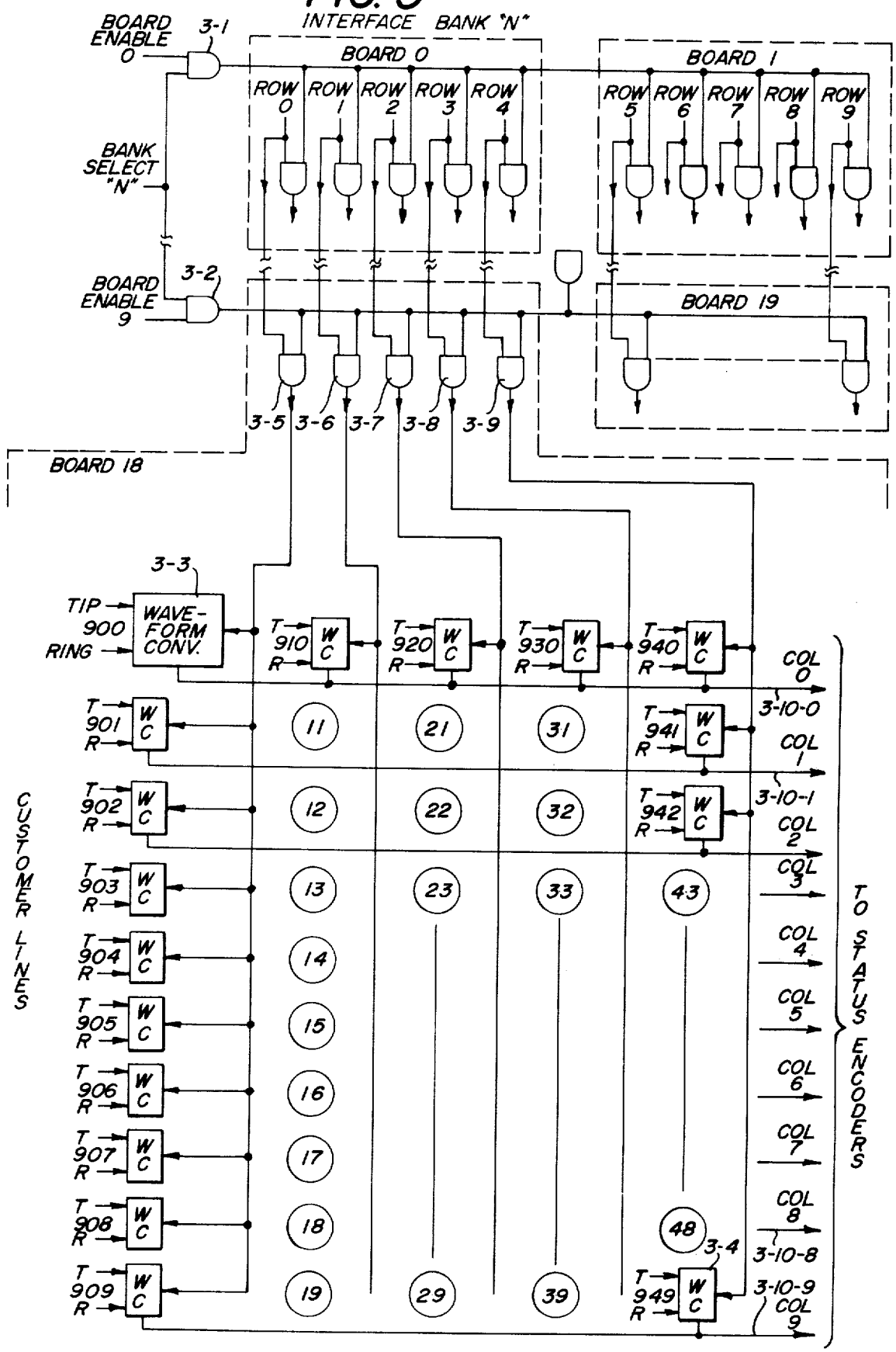

United States Patent [19]

Connell et al.

[11] 4,022,978

[45] May 10, 1977

[54] EVENT MONITORING TRANSCEIVER

[75] Inventors: Joseph B. Connell, Moorestown; Stephen M. Fillebrown, Cherry Hill; Michael J. Horwitz, Willingboro, all of N.J.; John C. Watson, Levittown, Pa.

[73] Assignee: Telesciences, Inc., Moorestown, N.J.

[22] Filed: Nov. 14, 1975

[21] Appl. No.: 632,010

[52] U.S. Cl. .............................. 179/8 A; 179/7.1 R
[51] Int. Cl.² ...................................... H04M 15/18
[58] Field of Search ............ 179/7 R, 7.1 R, 7 MM, 179/7.1 TP, 8 R, 8 A, 175.2 R

[56] References Cited
UNITED STATES PATENTS

| | | | |
|---|---|---|---|
| 3,562,436 | 2/1971 | Lutgenau | 179/7.1 R |
| 3,813,495 | 5/1974 | Conerly | 179/7 MM |
| 3,825,689 | 7/1974 | Baichtal et al. | 179/8 R |
| 3,870,823 | 3/1975 | Gayler et al. | 179/7 MM |
| 3,916,123 | 10/1975 | Werner et al. | 179/8 A |

*Primary Examiner*—Kathleen H. Claffy
*Assistant Examiner*—Gerald L. Brigance
*Attorney, Agent, or Firm*—Edelson and Udell

[57] ABSTRACT

A data terminal utilizes a time division multiplexer to monitor traffic on up to 8000 input lines in banks of 1000 lines and converts the information in each bank from parallel to serial form as 1000 serial 112 bit parallel words, records the various kinds of event count data and usage time duration for each input line, and under interrogation by a control center transmits the accumulated data.

The terminal has up to eight serial synchronously operating memory banks, one for each bank of 1000 lines, each memory bank containing an accumulating memory which counts the events as they occur and a passive memory which upon command receives data from the accumulating memory. The condition of each line is examined continuously cyclically to determine the presence or absence of specifically different particular events and the durations of such events. The accumulated data is usable directly for billing purposes when the apparatus is used to monitor telephone subscriber lines.

A processing verifier generates test signals and processes them through the apparatus to determine the functional accuracy of the apparatus, and generates an alarm when a malfunction is detected.

59 Claims, 30 Drawing Figures

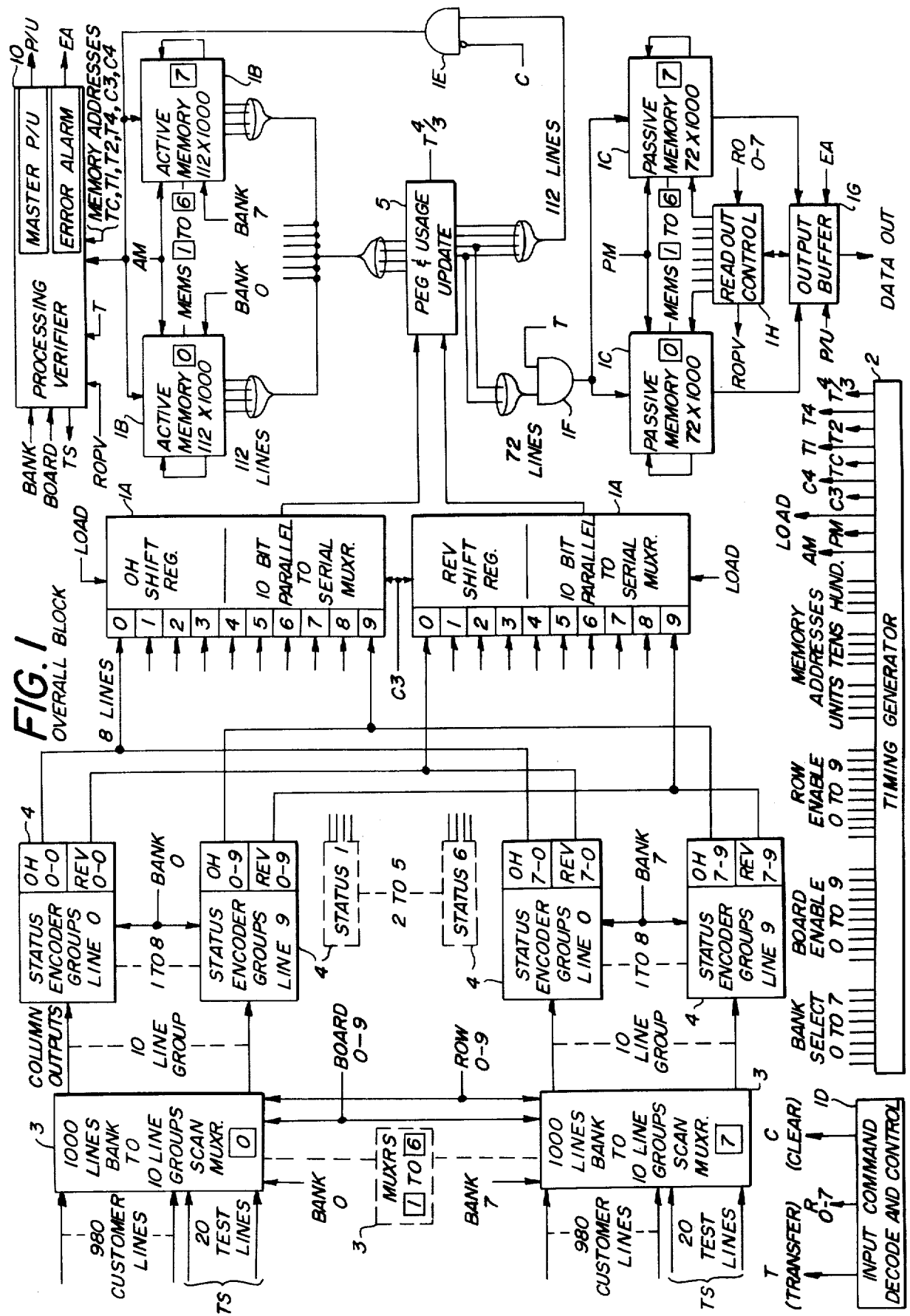

FIG. 12
CHECKING SIGNAL SIMULATORS
FIG. 2
PRIMARY TIMING GENERATOR
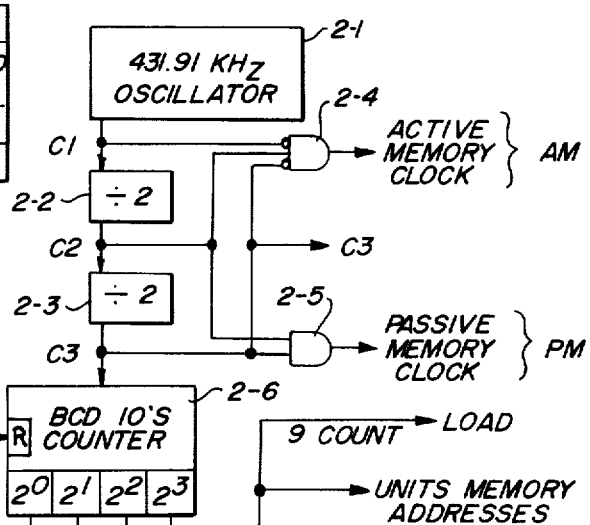
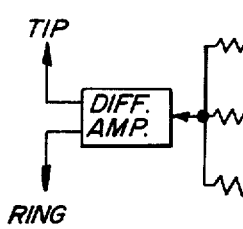
FIG. 12A
TIP AND RING SIMULATOR
FIG. 12B
SLEEVE AND METER SIMULATOR
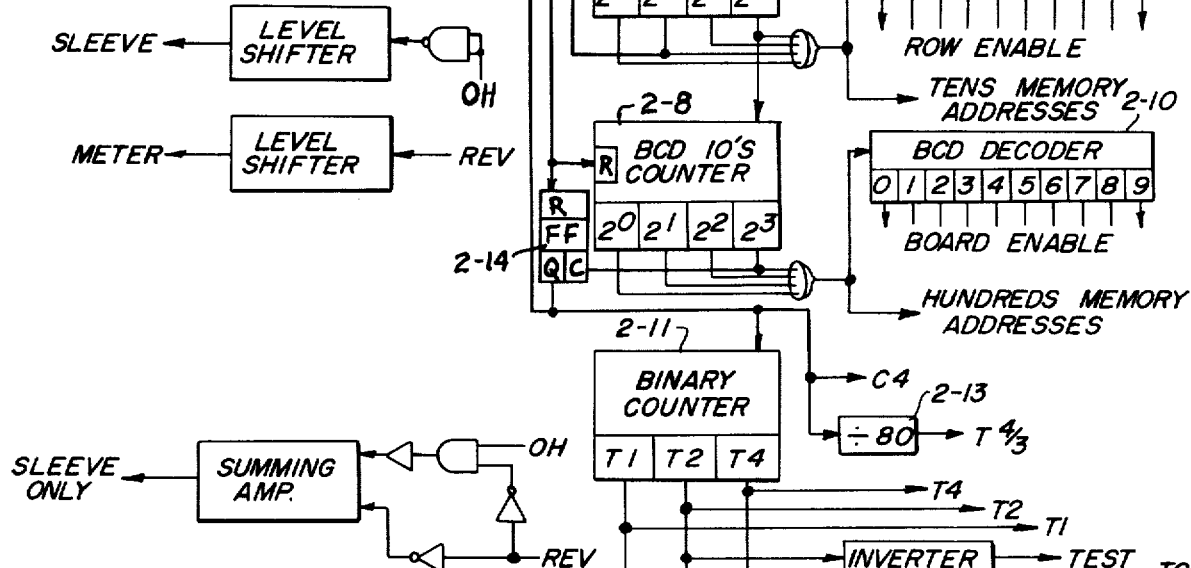
FIG. 12C
SLEEVE ONLY SIMULATOR
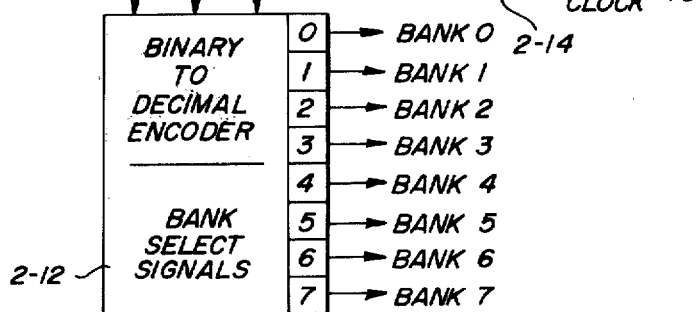

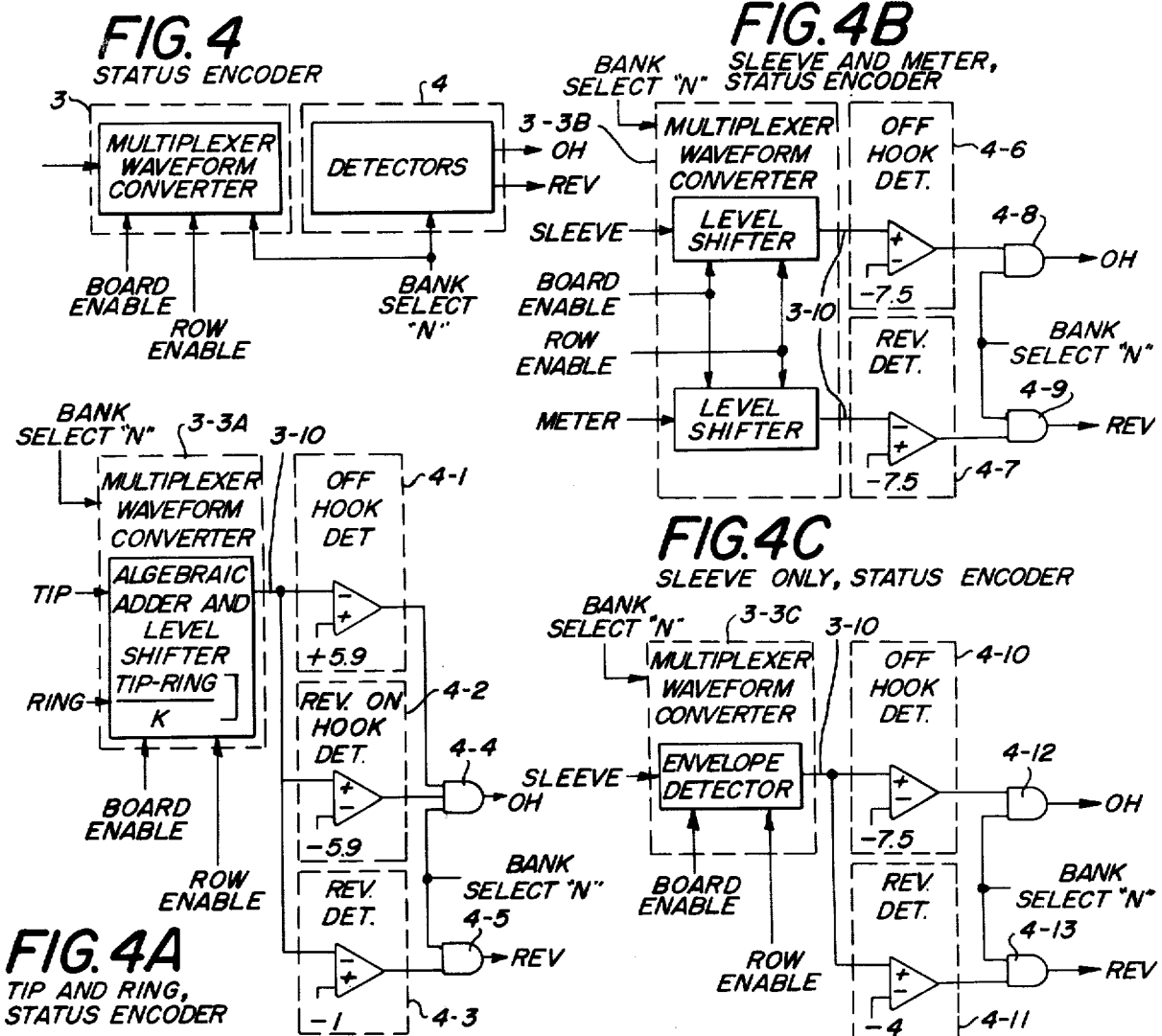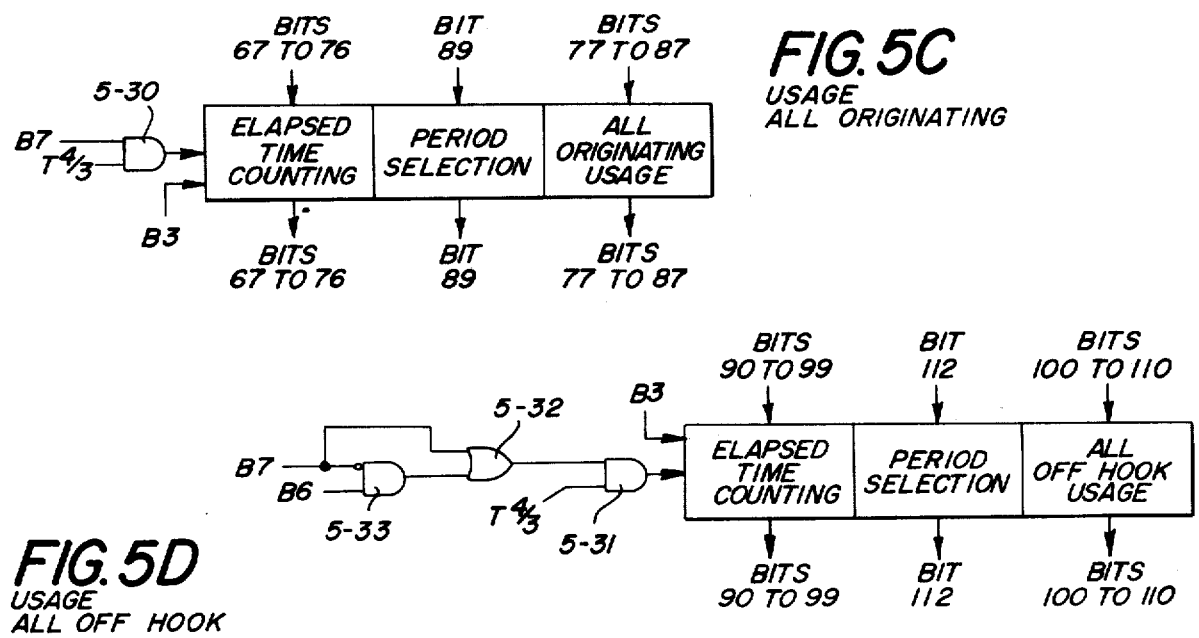

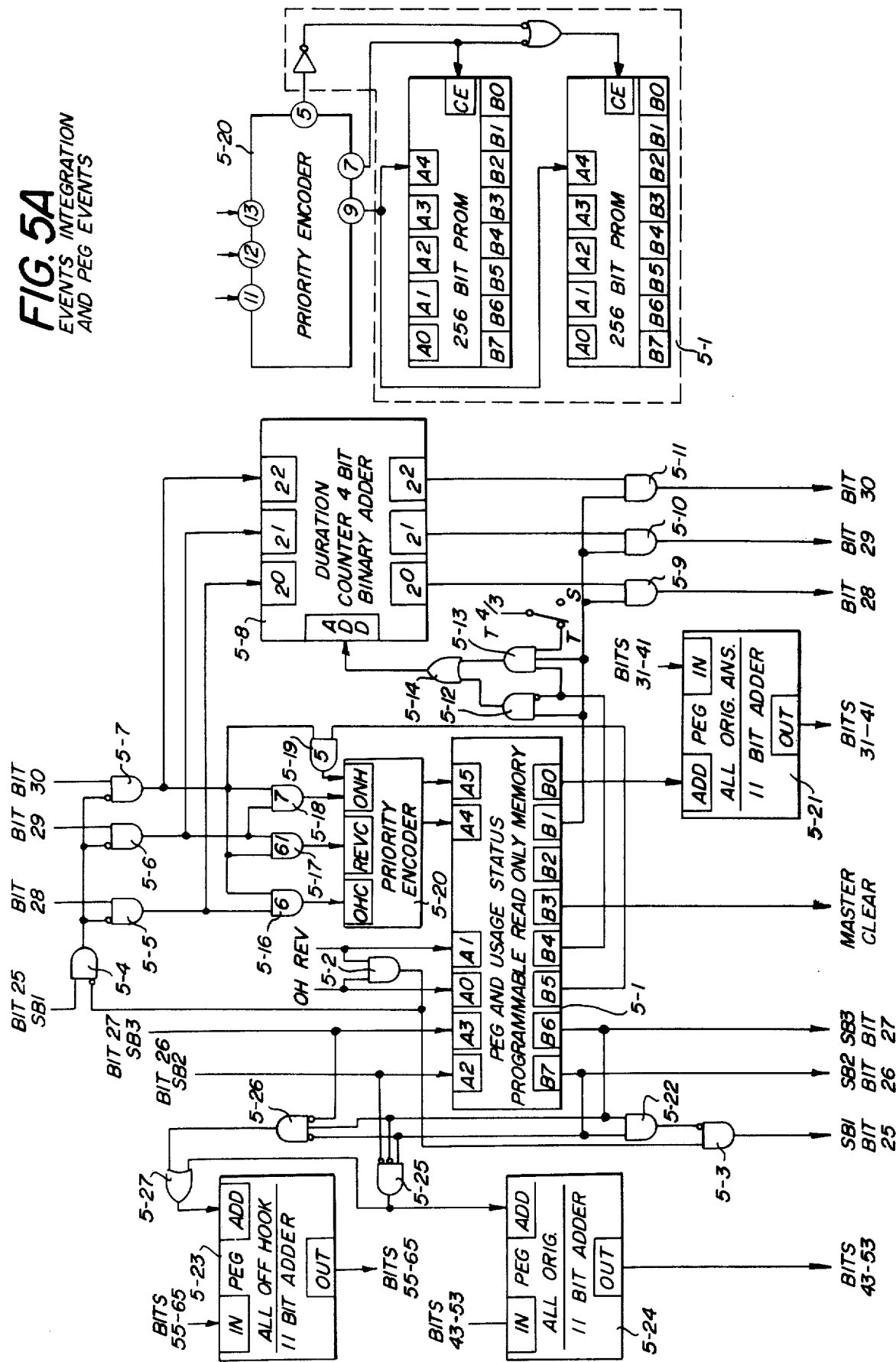
FIG. 5A EVENTS INTEGRATION AND PEG EVENTS

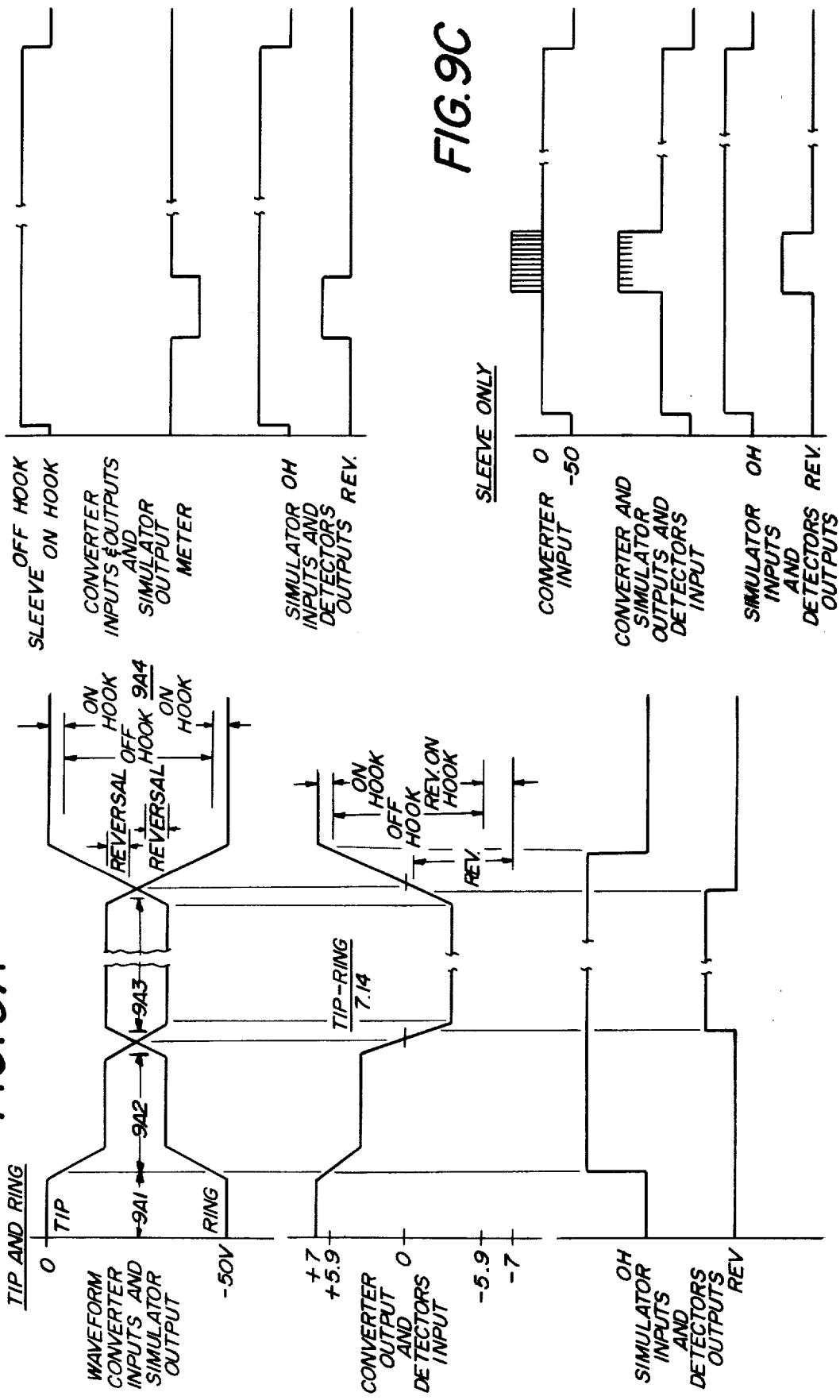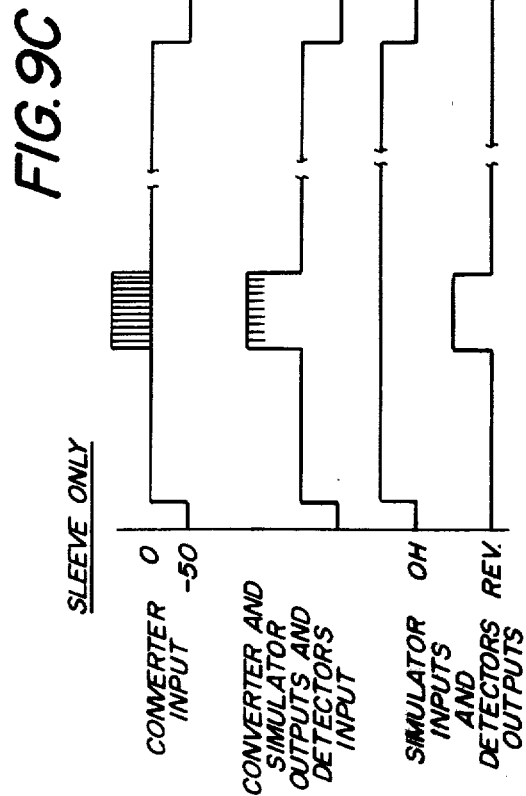

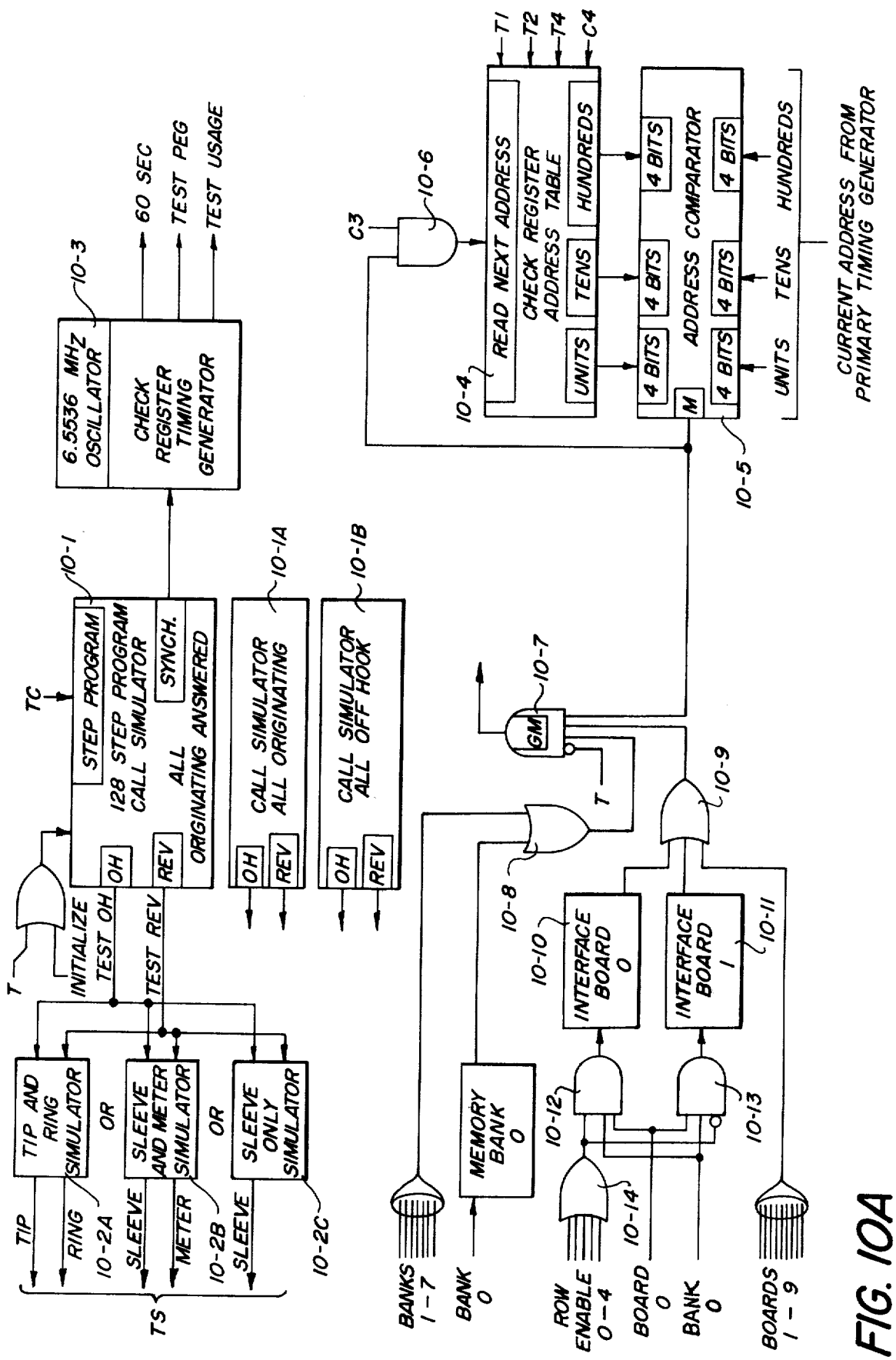
FIG. 10A  PROCESSING VERIFIER PROGRAM & CONTROL

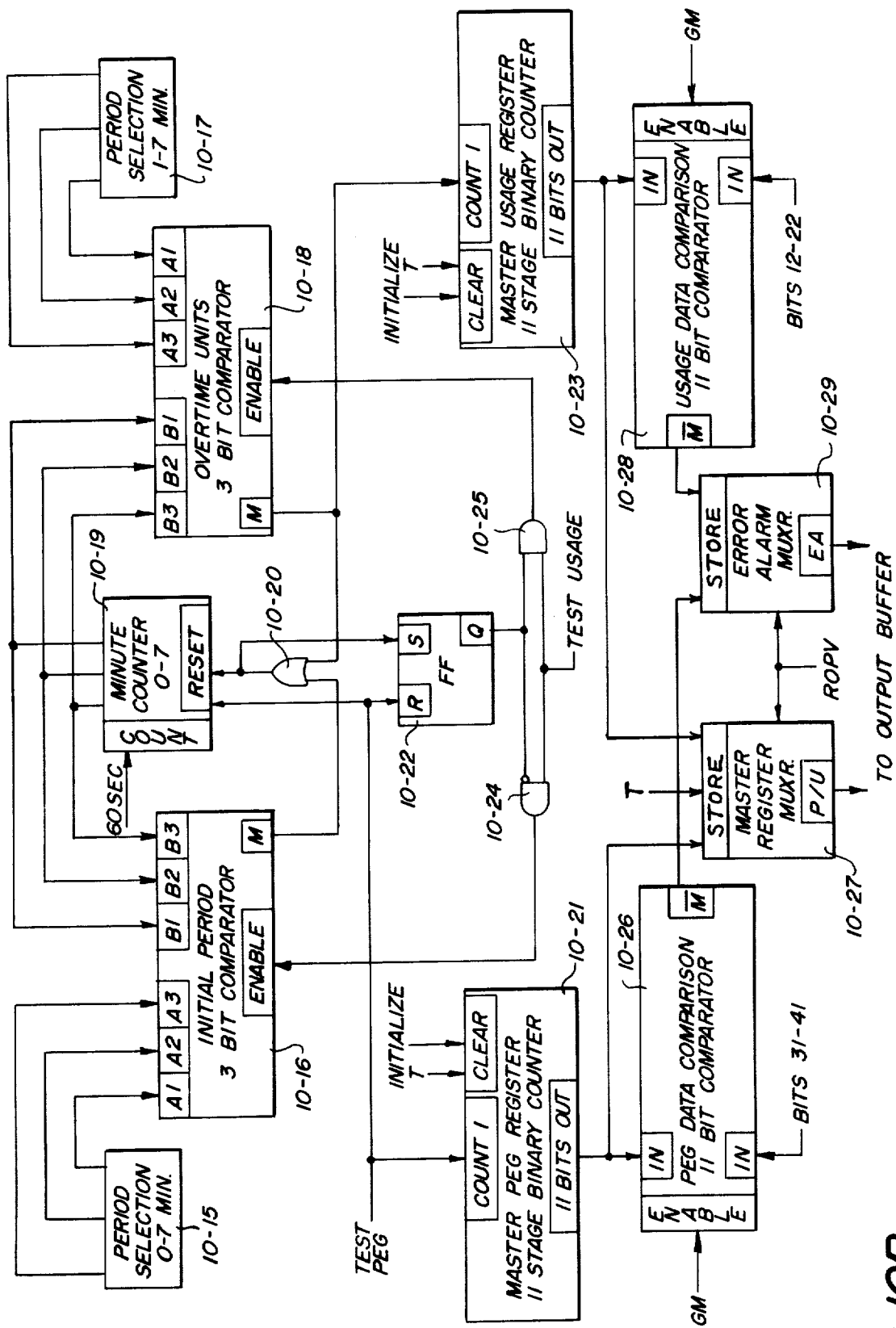
FIG. 10B  PROCESSING VERIFIER DATA CHECKING

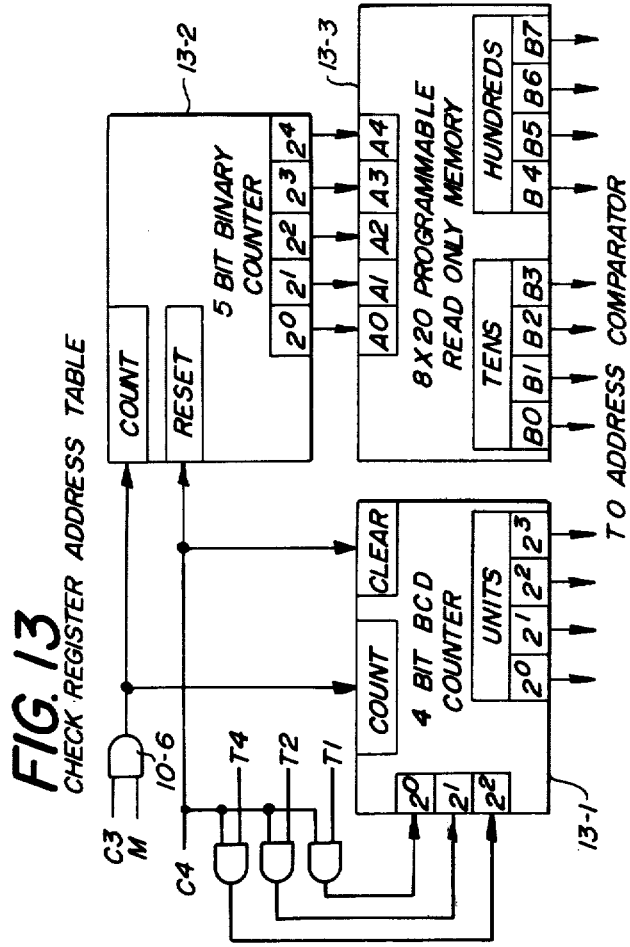
FIG. 13 CHECK REGISTER ADDRESS TABLE
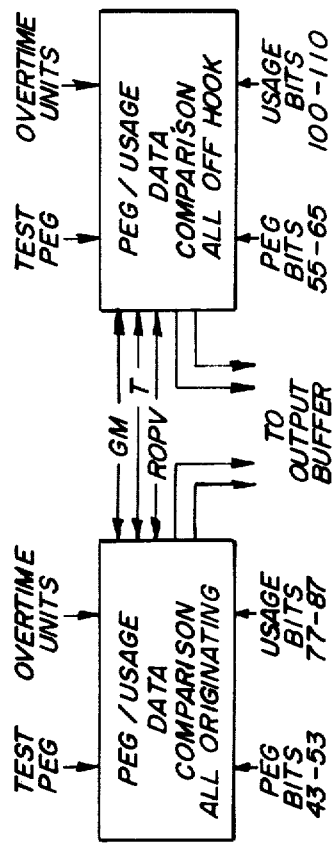
FIG. 10C CHECK REGISTER DATA COMPARISON
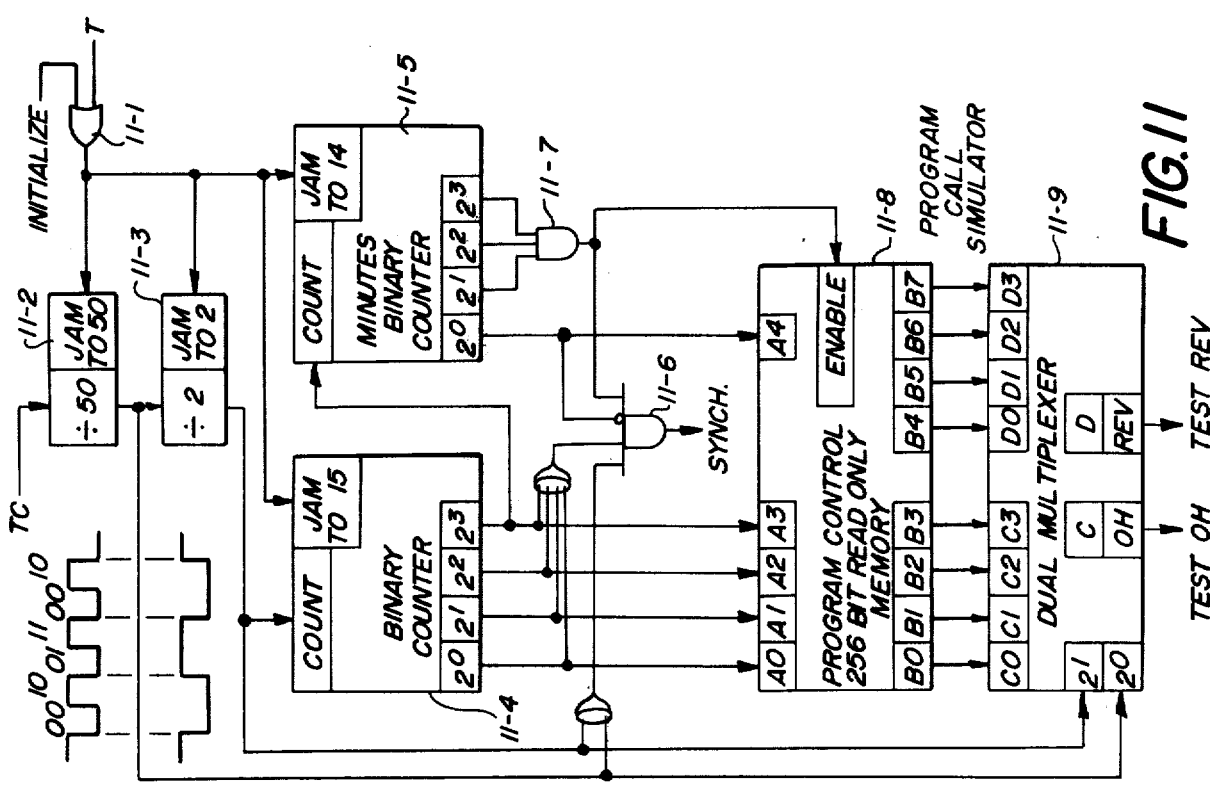
FIG. 11

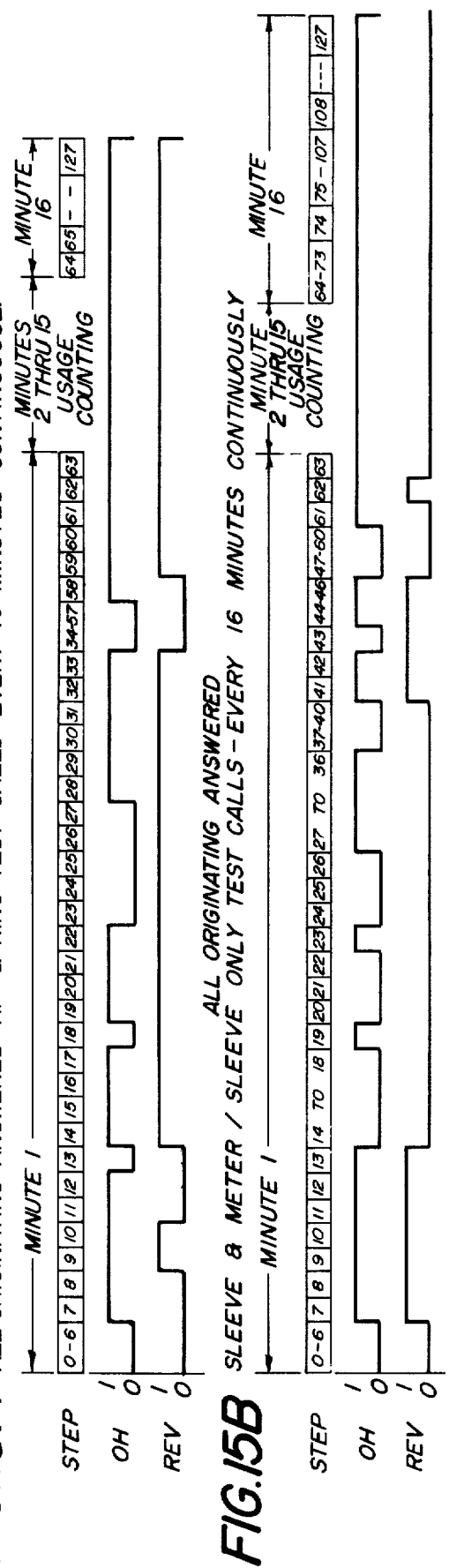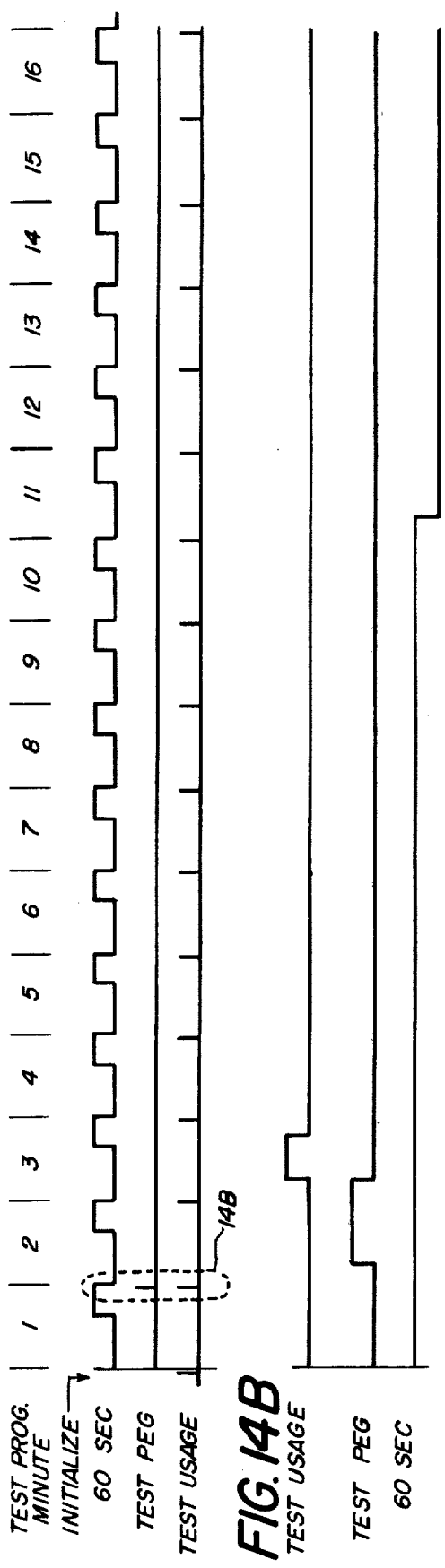

EVENT MONITORING TRANSCEIVER

This invention relates generally to event monitoring transceiver apparatus for monitoring a plurality of independent event generating systems, determining when particular kinds of events have occurred on each system and the duration of such events, storing the monitored data in a plurality of locations, transferring ring data stored in certain locations to other locations, self checking the processing accuracy of the apparatus, and transmitting the data stored at any specified location to a remote supervising source upon command from the latter.

For illustrative purposes the invention will be described and illustrated as embodied in an automatic telephone traffic monitoring terminal used for the automatic collection of telephone traffic data. The traffic data recorded could be for example the number and duration of calls on given telephone subscriber lines with data showing local overtime usage for all originating(outgoing) answered calls, the number and duration of all originating calls whether answered or not, and the number and duration of all off-hook (incoming and outgoing) calls whether answered or not.

These foregoing identified types of discrete data enable the telephone company to precisely automatically determine proper billing to a subscriber for each subscriber line. If billing is based on the number and duration of originating answered calls, then this data is available as discrete information. The apparatus provides the ability to separate an initial time period of selectable duration from subsequent successive overtime periods which may be selected to be of a different duration from the initial time period.

By also providing data which discloses the total number of originating calls, irrespective of whether or not the calls are answered, the number of unanswered calls is determinable and the length of line time usage associated with such calls is known by merely subtracting therefrom the known data for the originating answered calls. Further, by providing data which discloses the total number and duration of off-hook line conditions, both originating and incoming, the number and duration of incoming calls is known by subtracting therefrom the known data for all originating calls. While such information is not presently used for billing purposes, it is valuable in providing an insight into traffic conditions in an exchange.

The apparatus according to this invention differs from that disclosed in U.S. Pat. No. 3,916,123, issued to the assignee of this application in that the patented apparatus has no processing verification capability and can not distinguish line conditions beyond whether or not there is some kind of line activity. It can not distinguish between originating and terminating calls or whether or not the call has been answered. Accordingly while being a powerful diagnostic tool, it is of limited use for billing purposes.

Briefly, the illustrated terminal embodiment of the invention utilizes time division multiplexing to monitor traffic on up to 8000 separate input lines, these lines being handled in banks of 1000 lines so that up to eight such banks may be incorporated into a terminal. All such banks are operated serially synchronously by a common line and memory address module which generates 8 bank addresses and 1000 line and memory addresses to handle up to the full terminal complement of 8000 monitored lines. A subscriber line may be either a tip and ring pair, a sleeve and meter pair, or a sleeve lead only.

The multiplexing is carried out in a two stage parallel/serial sequence. The 1000 lines of each bank are divided into 100 sequential groups of 10 lines. The data on each 10 line group is made available for examination by a parallel transfer to binary encoders which encode the line status into a pair of binary signals and then the binary coded data on these lines is looked at in serial sequence. When all 10 lines of a group have been examined, the data on the next 10 line group is parallel transferred for serial examination.

Each 1000 line bank has a memory bank associated with it, each such memory bank including an active and a passive memory for monitored event count data, and an active and passive memory for monitored event time duration or usage data. Accordingly, up to eight such memory banks may be provided in a terminal. The monitored data is accumulated in each of the active memories as 1000 serial 112 bit parallel words, and, upon command, corresponding particular 72 bit words are transferred to the associated passive memories. Additionally, upon command, the stored data is selectively readable out of any specified passive memory in the terminal. The memory transfers and data readouts may be implemented in any convenient manner, such as in the way particularly disclosed in the aforementioned U.S. Pat. No. 3,916,123.

The apparatus includes a processing verifier which generates specific test signals according to a program and places these signals into a selected number of input lines to each 1000 line bank, as for example 20 lines. These test signals are then treated by the apparatus in the same manner as any signal appearing on any subscriber line. After processing through the apparatus and being stored in the appropriate memory locations these processed test signals are compared with the known generated test signals. Should the processed and test signals not match, an error alarm signal is generated indicating a processing error. Receipt of such an error alarm locally or at a downstream interrogating device allows the initiation of a programmed checking routine to determine the exact nature and location of the malfunction, allows switchover to standby equipment until the problem is cleared, and indicates when the last reliable information had been received.

In order to insure only the recording of valid data, each line is examined at spaced time intervals and an event is recorded as true data only after a specified number of successive line examinations or looks verifies the desired event present condition. The times between looks are selectable and may be different for different line conditions being examined for. Similarly, time duration data is only recorded when a verified event present condition has been established.

Figure 5B:
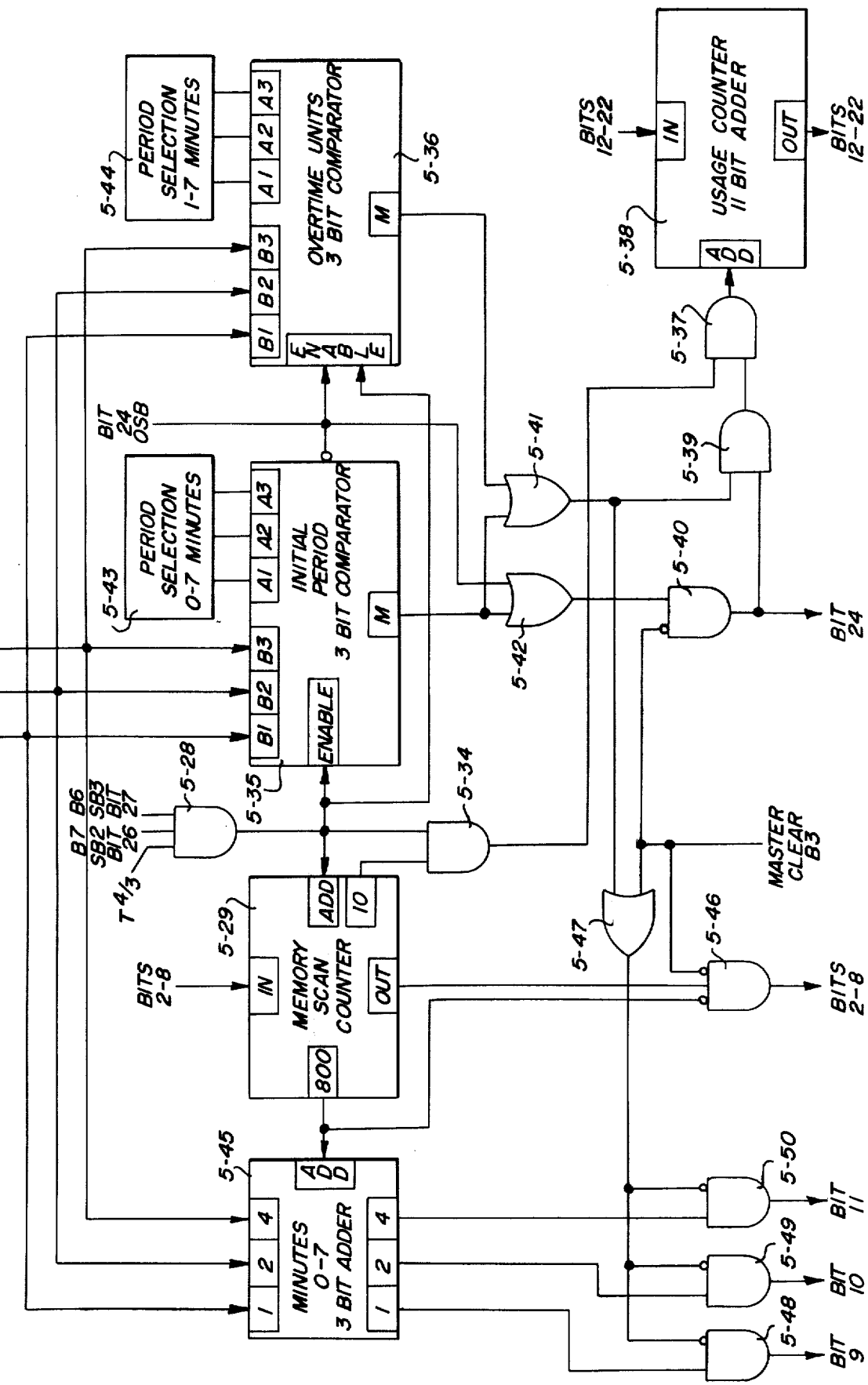
Figure 6:
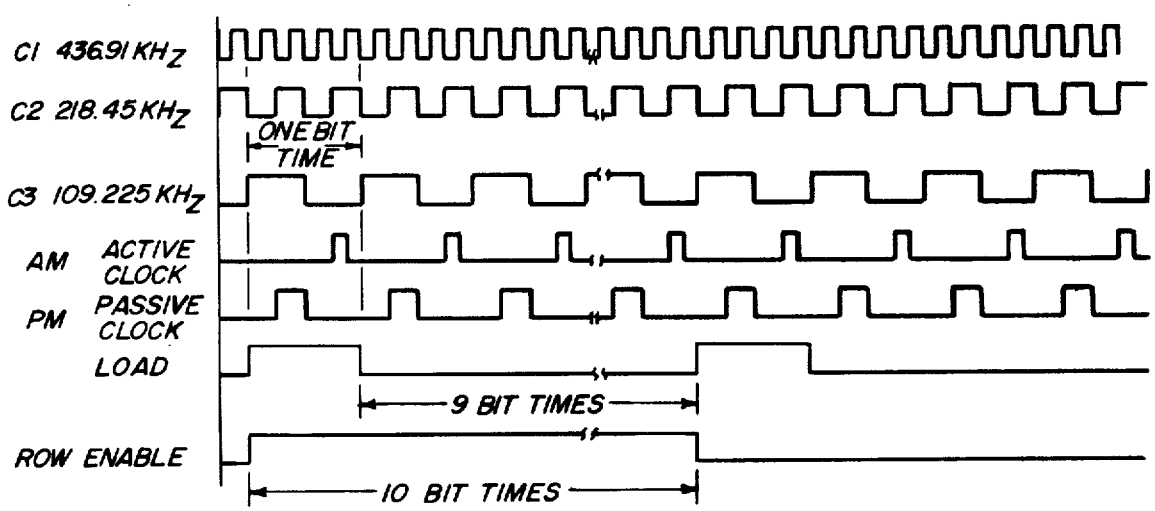
Figure 7:
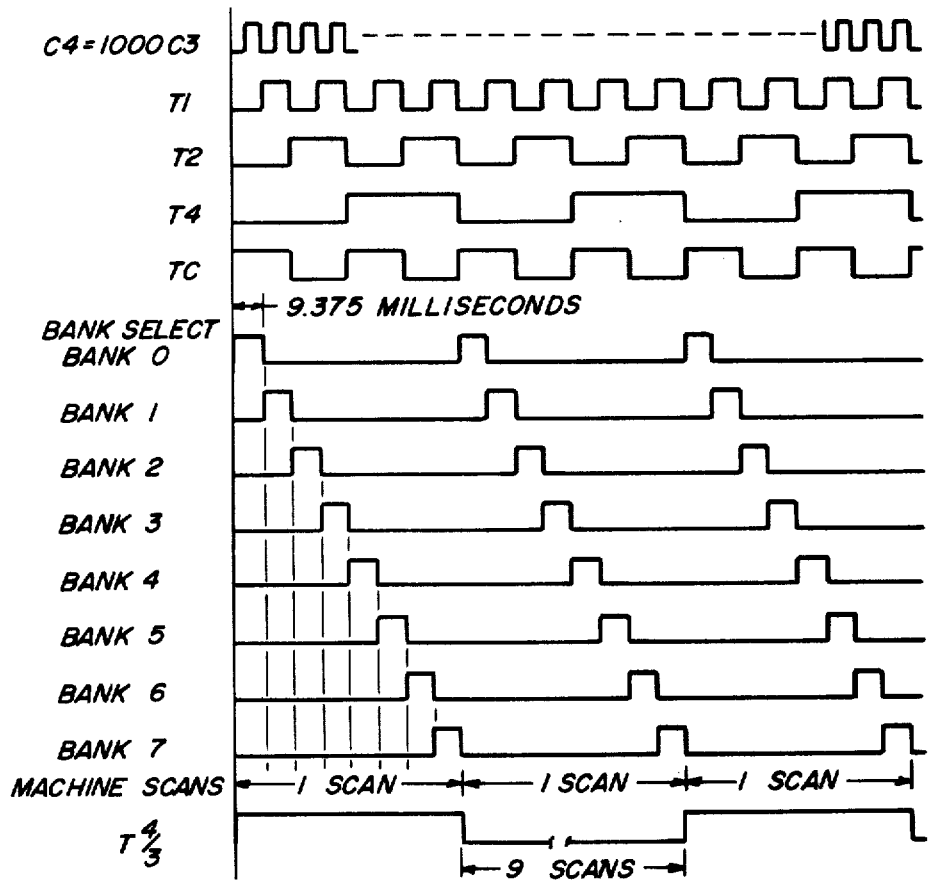
Figure 8:
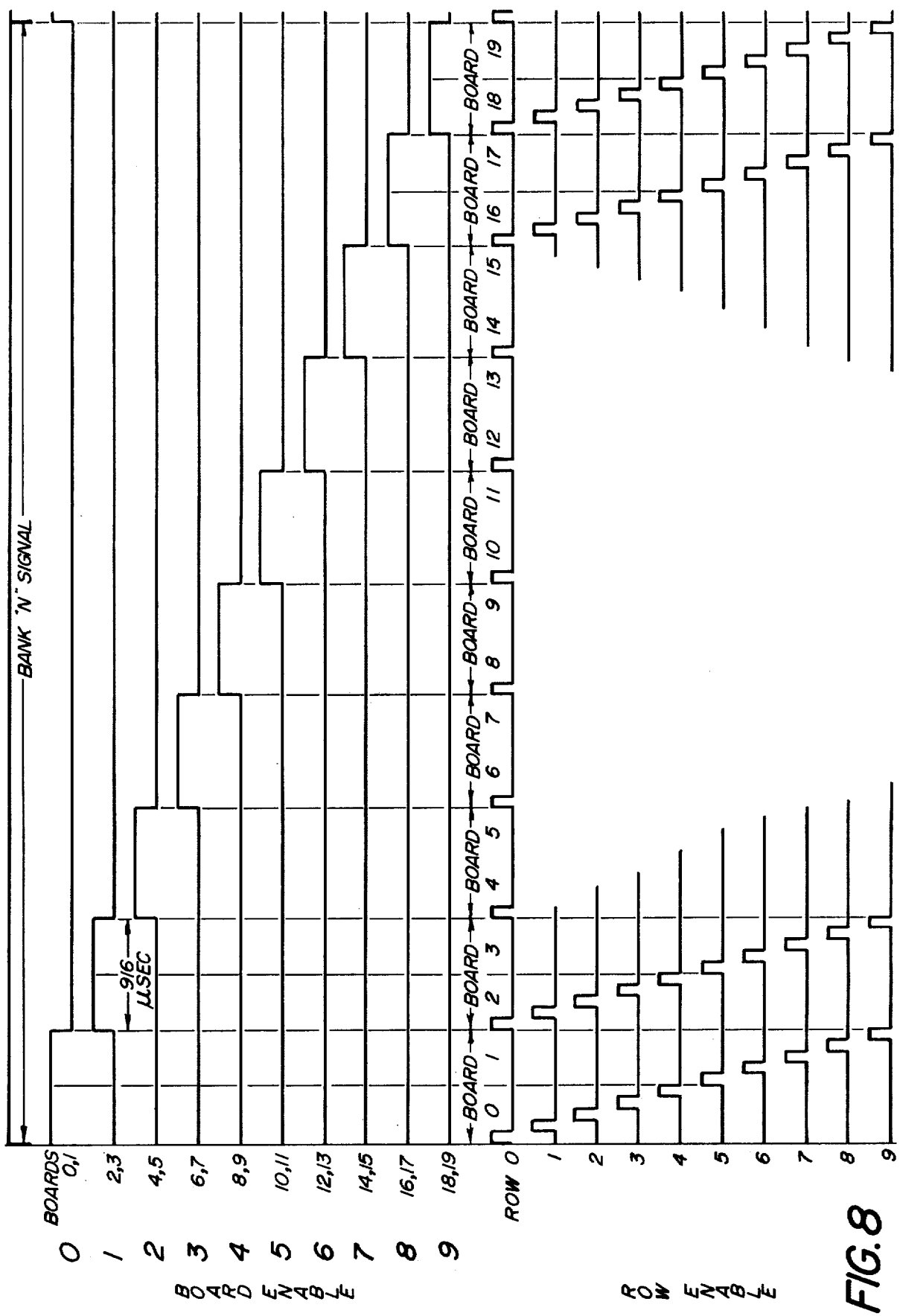

The objects of the invention are to provide novel event monitoring transceiver apparatus:

for monitoring a plurality of different conditions on a plurality of independent event generating systems, storing the monitored data, and transmitting the stored data to a remote interrogating source upon command of the latter;

wherein each monitored event generating system is monitored to determine the nature or character of the events occurring during a particular time interval, and storing data corresponding to each of the different kinds of events, the stored data including occurrence and time duration information;

the invention as embodied in the illustrated apparatus is hereinafter described in the following sections:

| GENERAL DESCRIPTION | -FIG. 1 |
|---|---|
| TIMING | -FIGS. 2,6,7,8 |
| INPUT MULTIPLEXING | -FIGS. 3,7,8 |
| INPUT SIGNALS ENCODING | -FIGS. 4,4A,4B,4C,9A,9B,9C |
| PEG AND USAGE UPDATING | -FIGS. 5A to 5D |
|    PEG EVENT CIRCUITS | -FIG. 5A |
|    USAGE INTERVAL CIRCUITS | -FIGS. 5B,5C,5D |
|    PEG AND USAGE INCREMENTING | -FIGS. 5A to 5D, TABLE 2 |
| PROCESSING VERIFIER | -FIGS. 10 THROUGH 15 |
|    PROGRAM & CONTROL | -FIG. 10A |
|    DATA CHECKING | -FIGS. 10B,10C,12,14A & B, 15A & B |
|    PROGRAM CALL SIMULATOR | -FIG. 11 |
|    CHECK REGISTER ADDRESS TABLE | -FIG. 13, TABLE 3 |
|    ERROR CHECKING | TABLE 3, FIG. 3 | for connection directly to the tip and ring leads, or to the sleeve and meter leads, or to only the sleeve lead of telephone exchange equipment, without interfering with or requiring modification of the telephone system equipment for monitoring the traffic conditions on the telephone service subscriber lines;

for interfacing with the telephone system equipment which encodes the signals on the tip and ring, or sleeve and meter or sleeve only leads into a pair of binary signals denoting the line conditions of on-hook, off-hook, reversal or reversed on-hook;

including interpreting apparatus which determines whether the line condition represents a condition of idle, originating be done answered call, originating unanswered call, or terminating call, and which further determines the length of time of each such condition on each subscriber line and how much of such time is overtime with respect to a pre-set initial time period;

including a data processing verification system which generates test signals which simulate either tip and ring, or sleeve and meter or sleeve only telephone line signals, and processes the test signals through the apparatus according to the invention to determine the functional accuracy of the apparatus, and which generates an alarm when a processing malfunction is detected.

The foregoing and other objects of the invention will appear more fully hereinafter from a reading of the following specification and claims in conjunction with an examination of the appended drawings, wherein:

FIG. 1 is an overall functional block diagram of the apparatus according to the invention;

FIGS. 2 through 5 and 10 are more detailed logic diagrams of functional blocks 2 through 5 and 10 respectively of FIG. 1, that is, FIG. 2 is a more detailed logic diagram of the timing generator logic of functional block 2 of FIG. 1; FIG. 3 is a more detailed logic diagram of the address logic of functional block 3 of FIG. 1, and so forth; and FIGS. 11, 12 and 13 are more detailed logic diagrams of the processing verifier functional block 10 of FIG. 10A;

FIGS. 6 through 9, 14, and 15 are timing and waveforms diagrams showing the important timing waveforms present within the apparatus according to the invention, the different figures being scaled to different time bases but correlated with one another.

In the several figures, like elements are denoted by like reference characters.

A more complete understanding of the invention can best be had by fist considering the overall operation of the apparatus, and then considering the detailed means for carrying out the various operations. Accordingly,

GENERAL DESCRIPTION - FIG. 1

As shown in the functional block diagram of FIG. 1, up to 8000 input lines may be connected to the terminal through up to eight 1000 line Input Scan Multiplexers 3, each such scan multiplexer being designated as a bank. The sequential scanning of the subscriber lines to which the Scan Multiplexers 3 are connected, and the insertion into Active Memories 1-B of the data derived from those lines into memory locations which correspond to each individual line which is examined, is controlled by the Primary Timing Generator 2 by means of timing signals which it routes to the Status Encoders 4, Parallel to Serial Multiplexers 1-A and the Peg and Usage Update Circuits 5.

The Primary Timing Generator 2 continuously cyclically generates an array of timing pulses, one of which, the C3 pulse constitutes one bit time. One bit time corresponds to the time allocated to perform all of the data scan functions connected with any single input line connected to the Input Scan Multiplexers 3. For example, a specific line connected to the Scan Multiplexers 3 will effectively be examined during one bit time and the next successive line to be scanned will be examined during the next bit time, and so on. In actuality this is accomplished by a series of parallel to serial transfers. The first of these parallel to serial transfers is the parallel transfer of a 10 line group of the 1000 line bank to the Status Encoders 4, where after encoding, a second parallel transfer to the Parallel to Serial Multiplexers 1-A takes place, followed by a serial transfer to the Peg and Usage Update Circuits 5. This sequence is then repeated for the next 10 line group of the 1000 line bank, and so on for 100 such groups to thereby complete the scan of the entire bank.

After completing the scan of the first bank, Bank 0, the next bank, Bank 1, is scanned in the same manner, and so on until Bank 7, for a total of eight banks constituting 8000 lines, has been scanned. This complete 8000 line scan is designated as one machine scan, and when completed is repeated continuously. The Bank Select, Board Enable and Row Enable signals from the Primary Timing Generator 2 which are applied to the Scan Multiplexers 3 effect the sequential selection of successive 10 line groups of subscriber lines for transfer to the Status Encoders 4. The Load signal and C3 signal respectively, from the Primary Timing Generator 2, cause the parallel transfer of the encoded line data from the Status Encoders to the Parallel to Serial Multiplexers 1-A and the serial transfer from the latter to the Peg and Usage Update Circuits 5.

The Primary Timing Generator 2 also generates an AM CLOCK signal and a PM CLOCK signal once during each bit time. The AM clock signals are utilized during the process of data accumulation and memory transfer to step data through the Active Memories 1-B to the Peg and Usage Update circuits 5 and back into active memory. The PM clock signals recirculate the data through the Passive Memories 1-C and step new data in from the Active Memories 1-B during a data transfer. The C and T signals from the Input Command Decode and Control block 1-D respectively clear the Active Memories 1-B by inhibiting recirculation through the gates 1-E and enable a transfer from Active Memory to passive memory by opening gates 1-F. The T 4/3 signal from the Primary Timing Generator 2 which occurs once every ten machine scans and persists for one machine scan is utilized in the Peg and Usage circuits.

The Peg and Usage Update block 5 examines the data presented to it from the Status Encoders 4 and determines whether or not an event has occurred on each and every line which is examined, the nature of the event, and also determines the total length of time in excess of a pre-set selectable time that such events have occurred on each line. This information is encoded as binary bit signals and sent to the appropriate Active Memory block 1-B where it is stored in the memory location which corresponds to each line monitored by the corresponding Scan Multiplexer. The Active Memory blocks 1-B and Passive Memory blocks 1-C each contain one memory bank for each Scan Multiplexer monitoring 1000 lines so that in a full terminal there would be eight such active memory banks numbered from 0 to 7 and eight such passive memory banks number from 0 to 7.

Each active memory bank contains shift registers which accumulate peg event count data and usage interval count data on a currently accumulating basis, there being separate memory storage for the peg events and separate memory storage for the usage count. Each of the passive memories receives and holds the contents of the associated active memory when transfer is carried out upon receipt of a specific transfer command from the Input Command Decode and Control block 1-D.

The accumulated data stored in the Passive Memory banks 1-C may be read out through the Output Buffer 1-G, upon receipt of an input command from a supervising computer directing which specific data is to be read out. Since a terminal may contain, in this illustrative example, up to eight separate memory groups, it will be understood that eight separate commands for memory read out must be provided for in order to be able to selectively read the data out of any particular memory of the memory groups.

Upon receipt of the appropriate command by the Input Command Decode and Control block 1-D, the latter generates an appropriate one of the read out command signals designated generically as RO 0-7. This signal is routed to the Read Out control block 1-H which in response thereto activates the Output Buffer 1-G, causes the selected Passive Memory block 1-C to read out through the Output Buffer 1-G, and generates the ROPV signal which causes the Processing Verifier block 10 to read out through the Output Buffer the Master Peg and Usage registers data P/U, and, if there has been a processing error the error alarm signal EA.

The specific signals for causing transfers from active to passive memory and for reading data out of the apparatus by utilizing specific circuitry for the Input Command Decode and Control block 1-D, the Output Buffer block 1-G and Readout Control block 1-H do not form part of this invention, and any desired implementation may be utilized. In particular, the implementation disclosed in complete detail in the aforesaid U.S. Pat. No. 3,916,123 may be satisfactorily utilized.

The Processing Verifier block 10 generates a programmed sequence of test signals TS which are connected to selected input circuits of each Input Scan Multiplexer 3 which views these signals in the same way as though they were subscriber line signals. The test signals are processed through the apparatus and stored in the proper address location of the appropriate Active Memory block 1-B, and are also compared with the master peg and usage registers data contained in the Processing Verifier. If the processed data does not match the master register data an equipment malfunction has occurred somewhere in the processing and an error alarm signal EA is generated.

The significance of such test errors is of course that the same processing malfunction may well be occurring with respect to the data which is being recorded from the active subscriber lines. Since such data is being used for billing purposes, errors can not be tolerated and rapid detection and correction of equipment malfunction is critically important. The generation of the test signals TS and the synchronization of operation of the Processing Verifier 10 with the rest of the apparatus is effected by means of the Primary Timing Generator 2 signals, TC,T1,T2,T4,C3,C4, the bank select, board enable and memory address signals.

TIMING - FIGS. 2,6,7,8

Referring now to FIG. 2 which shows the detailed logic of the Timing Generator block 2 of FIG. 1, it is observed that the timing signals are all derived from a 431.91KHZ crystal oscillator 2-1, the output of which is divided by a timing chain to generate all of the timing signals. The basic clock signals timing for the various internal operations of the apparatus is derived by dividing the basic oscillator rate through two successive divide-by-two networks 2-2 and 2-3 to generate the C1, C2 and C3 pulses which are gated by gates 2-4 and 2-5 to generate the AM and PM clocks, which together with the C3 signal are shown in the waveforms diagram of FIG. 6. Each of the C3 block pulses is 9.16 microseconds in length and constitutes one bit time. The active clock AM and passive clock PM occur once each bit time but are of shorter duration and are time-spaced with respect to the C3 clock and each other.

The Load signal and Units Memory Addresses are generated by counting C3 clock pulses through BCD 10's counter 2-6, the Load signal occurring for one bit time once for every 10 C3 clocks, and hence once every 10 bit times. This signal causes the two sets of 10 parallel bits in the Status Encoders 4 to be loaded into the two 10 Bit Parallel to Serial Multiplexers 1-A. Since it requires 10 bit times to serially read out the data from the Multiplexers 1-A, the Load signal remains down until read out is complete and then arises to load the next 10 bits from the Status Encoders 4.

The 4 bits of Units Memory Address, together with the 4 bits of Tens Memory Address and the 4 bits of Hundreds Memory Address generated respectively by BCD 10's Counters 2-7 and 2-8 are routed to the Processing Verifier Program and Control circuits shown on FIG. 10A to determine when the address of a test circuit has been reached.

The output of BCD 10's Counter 2-7 also drives BCD Decoder 2-9 which generates the ten Row Enable signals 0-9, while the output of BCD 10's Counter 2-8 generates the C4 signal via flip-flop 2-14 and also drives BCD Decoder 2-10 which generates the ten Board Enable signals 0-9. The Board Enable and Row Enable signals are shown on the waveform diagram of FIG. 8, with one Row Enable signal being also shown on FIG. 6 in order to correlate the relative timing of the waveforms in these two figures. As shown in FIG. 6, a row enable signal is 10 bit times long, and the reason for this will appear in the discussion of the next section explaining the input multiplexing.

The C4 signal is 1000 C3 signal times in length and is shown as the first waveform of the timing waveform diagram of FIG. 7. Accordingly, the C4 signal is used to generate the eight Bank Select signals 0-7 via Binary Counter 2-11 and Binary to Decimal Encoder 2-12, the successive band select signals each arising once for every eight C4 signals and persisting for one C4 signal time interval. The bank select signals of 1000 bit times each persist for 10 board enable signal times and for 100 row enable signal times as shown on the timing waveform diagram of FIG. 8.

The C4 signal also generates the T 4/3 signal via the divide-by-eighty counter 2-13 and generates the T1, T2 and T4 signals via Binary Counter 2-11, these signals, being shown in FIG. 7. The TC signal is an inverted T2 signal derived from Inverter 2-14. The T 4/3 signal is 75 milliseconds long and is used in the Peg and Usage Update circuits of FIGS. 5A through 5D to provide a one machine scan length timing signal which occurs only once in each ten machine scans. The TC,T1,T2 and T4 signals are all utilized in the Processing Verifier Program and Control circuits of FIG. 10A in conjunction with the Call Simulator circuit of FIG. 11 and the Check Register Address Table of FIG. 13.

INPUT MULTIPLEXING - FIGS. 3,7,8

Referring now to FIG. 3 in conjunction with the timing waveform diagrams of FIGS. 7 and 8, the input multiplexing for one of the Input Scan Multiplexers 3 will now be described. The showing of FIG. 3 represents a complete multiplexer interface bank of 1000 input signal lines shown for illustrative purposes as designed to interface with a tip and ring exchange.

Each interface bank consists of 20 interface boards numbered from 0 to 19 and four of which are shown in FIG. 3, namely boards 0,1,18 and 19. The break lines between boards 0 and 18 and between boards 1 and 19 of course indicate that boards 2 through 17 are positioned therein. Boards 0,1 and 19 are shown representationally with merely their input gating illustrated, whereas board 18 is shown in expanded form to delineate the final multiplexing from the tip and ring leads through to the status encoders.

From FIG. 8 it is observed that there are 10 Board Enable signals 0-9, and from both FIG. 3 and FIG. 8 it is observed that each board enable signal enables two of the interface boards in the bank. For example, Board Enable signal 0 enables Boards 0 and 1 through gate 3-1 when the proper bank select signal is also applied to the gate. Similarly, Board Enable signal 9 enables boards 18 and 19 via gate 3-2 when the proper bank select signal is present. Each of the 20 interface boards contains 50 gated Waveform Converters 0 through 49 as shown for Board 18, the waveform converter for tip and ring leads 0 being designated as 3—3 while waveform converter for tip and ring leads 49 is designated as gated Waveform Converter 3–4.

The 50 gated waveform converters in each interface board are arranged in vertical rows of 10 gates all of which are simultaneously enabled by a particular combination of board enable and row enable signals applied to a control gate. As shown in conjunction with Board 18, the gated waveform converters for tip and ring leads 0 through 9 are enabled via gate 3-5 by a Row Enable 0 signal in the presence of a Board Enable 9 signal from gate 3-2. Similarly, the gated waveform converters for tip and ring leads 10 through 19 are enabled through gate 3-6 by a Row Enable 1 signal in the presence of the Board Enable 9 signal from gate 3-2. In the same way the remaining three groups of 10 gates each are selectively enabled through gates 3-7, 3-8 and 3-9 when these gates in the presence of the Board Enable 9 signal from gate 3-2 respectively receive the Row Enable signals 2, 3 and 4.

Accordingly, the method of multiplexing the tip and ring signals into the status encoders is as follows. Since the apparatus includes eight banks of 1000 lines each, the bank to be multiplexed is first selected by the bank select signal which has just arisen, for example the Bank Select 0 signal. With The Bank 0 signal up and all of the remaining bank select signals down, the only bank which can be read through will be the 20 interface boards whose input gates 3-1 and 3-2 are enabled by the presence of the Bank 0 signal. It is of course to be understood that there are eight more input gates corresponding to gates 3-1 and 3-2 which control the selection of the interface boards 2 through 17 in pairs of 2 boards in exactly the same manner as is illustrated for the Board Enable 0 signal and the Board Enable 9 signal. The specific boards which are enabled by each board signal are shown on the timing waveform diagrams of FIG. 8.

With the interface bank input gates enabled by the Bank Select 0 signal, the Board Enable 0 signal first arises to enable the 10 board gates which control the 5 rows of gated waveform converters in each of Boards 0 and 1. With all of the Board 0 and Board 1 input gates conditioned, the Row Enable signals 0 through 9 will successively gate through their respective gates during the time interval that each row signal is up and will cause the 10 gated waveform converters which are enabled thereby to pass the converted tip and ring signals onto the 10 column output lines designated as Column 0 through Column 9, with the Row Enable signals 0 through 1 gating out all of the line signals for Board 0 and the Row Enable signals 5 through 9 gating out all of the line signals for Board 1.

When now board Enable 0 signal goes low and board Enable 1 signal arises, Boards 0 and 1 will no longer be enabled and only interface Boards 2 and 3 will have their row enable gates enabled so that read-out will then take place from Board 2 followed by read-out from Board 3. The same progression follows sequentially with the rising and falling of successive Board Enable signals 2 through 9, the Row Enable signals 0 through 9 being generated for each board enable signal, all as shown in the waveforms of FIG. 8. When Board Enable signal 9 has completed the read-out of Interface Bank 0, the sequence of board enable and row enable signals immediately repeats, but these signals will now be locked out of Interface Bank 0 because of the fall of Bank Select 0 signal, but read-out will now take place in the previously described manner for Interface Bank 1 because the Bank Select 1 signal has arisen. In similar fashion read-out continues through all eight banks and then cyclically repeats continuously every 75 milliseconds, all 8000 lines being sequentially scanned during that time interval.

INPUT SIGNALS ENCODING - FIGS. 4,4A,4B,4C,9A,9B,9C

The column signals from the multiplexed interface board outputs just described in connection with FIG. 3 are routed as 10 column output lines 0 through 9 to the Status Encoders 4 as shown on the overall block diagram of FIG. 1. This 10 line group is the 10 outputs from the 10 waveform converters which are at that time gated by a particular board and row enable signal combination. The waveform converter for any particular column output is shown in FIG. 4 in representational form enclosed in a dotted box designated as 3 to denote that it is one of the multiplexer waveform converters as shown in FIG. 3. The output of that converter is routed to a group of detectors within an associated status encoder shown in FIG. 4 enclosed in a dashed box and designated generally by the numeral 4. The status encoder detectors are basically analogue to digital converters, and convert the input column signals to a pair of binary output signals designated as "OH" and "REV," the OH signal representing an off-hook status of the subscriber line while the REV signal arises when either a reversal or a reversed on-hook signal condition occurs on the subscriber lines.

While in FIG. 4 only a single status encoder detectors group is shown, in fact, there are 10 such detector groups associated with each input Scan Multiplexer 3, one detector group for each of the 10 column outputs from the Scan Multiplexer 3. Accordingly, in a full terminal having eight input scan multiplexers there would be eighty status encoder detector groups. As is observed from both FIG. 4 and FIG. 1, the only status encoders which are activated at any given time is the group of 10 status encoders activated by the bank select signal which is at that time up, all of the remaining status encoders being quiescent. In this way, while the Parallel to Serial Multiplexers 1A have each of their decimal inputs connected to the outputs of eight different status encoders, only one of the eight status encoders will be active at any given time.

Telephone exchanges do not all utilize the same type of equipment, some exchanges being of the type having tip and ring equipment while others have sleeve and meter equipment, and still others merely sleeve only equipment. The signals present on the subscriber lines of these different kinds of equipment are different, and it is the function of the multiplexer waveform converters to convert the particular signals on the subscriber lines into a form such that the status encoders can deliver a pair of binary OH and REV signals at their outputs, so that once the signals have emerged from the status encoders, the signals are standardized insofar as the rest of the apparatus is concerned. Accordingly, FIGS. 4A, 4B and 4C illustrate specific waveform converters and status encoders suitable for use respectively with tip and ring circuits, sleeve and meter circuits, and sleeve only circuits, the appropriate waveform converters and status encoders being chosen as determined by the type of exchange equipment to which the apparatus is to be connected.

Referring now to FIGS. 4A and 9A which illustrate the waveform converter and detectors together with the line signals for a tip and ring lead system, it is observed that the separate tip and ring leads are connected to an Algebraic Adder and Level Shifter 3–3A which algebraically subtracts the signal on the ring lead from the signal on the tip lead and reduces the amplitude by a factor of K and thereby presents on its output line 3–4 a single signal of varying amplitude. The top waveform of FIG. 9A shows the tip and ring signals for a sequence of line conditions starting out with an on-hook or idle line condition in the region designated as 9A1. This line condition then changes to an off-hook condition in the region designated as 9A2 when the subscriber instrument is taken off-hook for purposes of putting through an outgoing call. This is followed by a region designated as 9A3 corresponding to a line signal condition of reversal which occurs when the outgoing call is answered by the called party. When the call is completed, the calling and called parties hand up their instruments so that both the reversal signal and the off-hook signal are lost and the line signal status reverts to an idle or on-hook condition in the region 9A4 which is the same as the initial idle condition shown at 9A1. The algebraic addition and level shifting of the tip and ring lead signals effected by the Multiplexer Waveform converter 3–3A is shown as the single signal of the second waveform of FIG. 9A. It is this waveform which appears on the column output line 3–10.

The signal on column output line 3–10 is routed to three Status Encoder Detectors 4-1, 4-2 and 4-3 which respectively detect the subscriber line conditions of off-hook, reversed on-hook, and reversal. As is observed from the composite tip and ring waveform of FIG. 9A, when the line signal drops below plus 5.9 volts, an output is produced by off-hook detector 4-1, and this output will be passed through gate 4-4 as the beginning of the OH signal as long as the signal does not drop below minus 5.9 volts to thereby cut off the reversed on-hook detector 4-2. The reversal detector 4-3 generates an REV signal through gate 4-5 when the converted waveform signal drops to a level more negative than minus 1 volt. These OH and REV signals are shown in the bottom two waveforms of FIG. 9A, the high level designating the signal present condition and the low level designating the signal absent condition. A reversed on-hook signal condition can appear on the subscriber lines during an incoming call which has not as yet been answered, and when a call has been completed and the called party goes back on hook but the calling party has not gone back on hook. In such a circumstance, only the REV signal is generated but not the OH signal.

The sleeve and meter waveform signals shown as the upper two waveforms of FIG. 9B would be routed to status encoders of the type shown in FIG. 4B through a Multiplexer Waveform Converter 3-3B consisting of a pair of level shifters to establish the proper voltages on the pair of column output lines 3-10. The upper column output line 3-10 is routed to a Status Encoder Off-Hook Detector 4-6 while the meter lead signal appearing on the lower column output line 3-10 is routed to the Reversal Detector 4-7. When the sleeve signal is more positive than minus 7.5 volts, an OH signal is passed through gate 4-8. When the meter signal appearing on lower column output line 3-10 is more negative than minus 7.5 volts a positive REV signal is passed through gate 4-9. In a sleeve and meter system, the meter signal is not a continuous signal so that the REV signal is generated for a specific length of time, about 150 milliseconds, and then terminates. However, the time duration of the REV signal is more than sufficient for the apparatus to verify the presence of a valid reversal on the line indicating an answered call.

The top waveform of FIG. 9C shows the signal conditions on a sleeve only system in which a single line is required to carry the information denoting both off-hook and reversal conditions. When the line is idle in a sleeve only system, it remains at a level of substantially minus 50 volts. When a calling party goes off-hook the line level rises to 0 volts and ramains there as long as the party remains off-hook. When the called party answers the call, an alternating current signal is superimposed on the 0 voltage line signal and persists for a specific length of time to thereby denote the equivalent of a line reversal condition.

The Waveform Converter 3-3C shown in FIG. 4C is an envelope detector which looks at the sleeve lead signal and envelope detects it so that the higher amplitude alternating current signal appears as a detected direct current level, as shown in the second waveform of FIG. 9C. This latter waveform appears on column output line 3-10 and is routed to Off-Hook Detector 4-10 and to Reversal Detector 4-11 which respectively generate the OH and REV signals through gates 4-12 and 4-13. From the bottom two waveforms of FIGS. 9B and 9C it is observed that the OH and REV signals generated by both the sleeve and meter and sleeve only types of systems are the same even though their waveform converter input signals are different. Similarly, the OH signal of the tip and ring system is the same as for the sleeve and meter and sleeve only systems, while the REV signal for the tip and ring system remains up as long as the answered call continues, ass distinguished from the REV signals of the sleeve and meter and sleeve only systems which generate a REV signal for a fixed time interval and then terminate it.

PEG AND USAGE UPDATING - FIGS. 5A to 5D

FIGS. 5A to 5D show the logic circuitry contained within functional block 5 on the overall block diagram of FIG. 1. All of the 112 bit data words of each Active Memory Bank 0 through 7 are continuously cyclically sequentially recirculated through the peg and usage update circuitry at the same time that the OH and REV signal bits derived from each of the subscriber lines is also presented for examination. The peg updating circuitry examines the states of the OH and REV signals in conjunction with status data which is stored in certain bits of each of the active memory words to determine what the present status of the subscriber line signal condition is at that instant. If indicated, the updating circuitry alters the status information in the memory word then being examined and returns it to the active memory. If the status indicators disclose that a looked for event has occurred, then the updating circuitry increments the peg count with respect to that specific kind of event and commences a usage count. At the subsequently appropriate time, the usage circuitry increments the usage count in that particular memory location word as often as the line conditions require. When the particular line returns to an idle condition the usage counting for that line is terminated.

The peg and usage update circuits are basically time counting circuits and contain no storage or memory of their own, the memory function which denotes the status of each subscriber line being provided by certain bit locations of each word of the active memory. As observed from the overall block diagram of FIG. 1, the Peg and Usage Update Block 5 receives as inputs, the 112 bit lines from the then selected Active Memory 1B, the OH and REV signals fromm the corresponding Input Scan Multiplexer Bank 3 via the Status Encoders 4 and Parallel to Serial Multiplexers 1-A, and the T 4/3 timing signal from the Primary Timing Generator 2. The outputs from the Peg an Usage Update Block 5 are the status updated bits on the 112 bit lines which return the updated bits to the Active Memories 1B.

A detailed breakdown of the 112 bits of each memory word is shown in Table 1 which designates the bit numbers and the functions assigned to such bits.

TABLE 1

| BITS | FUNCTION | | |
|---|---|---|---|
| 1 | NOT USED | | |
| 25 | STATUS BIT 1 (SB1) | - | FALSE INCOMING CALL DETECTOR |
| 26 | STATUS BIT 2 (SB2) | - | OH STATUS (OFF HOOK) |
| | (B7) | | 0 = NOT PRESENT PREVIOUS SCAN |
| | | | 1 = PRESENT PREVIOUS SCAN |
| 27 | STATUS BIT 3 (SB3) | - | REV STATUS (REVERSAL) |
| | (B6) | | 0 = NOT PRESENT PREVIOUS SCAN |
| | | | 1 = PRESENT PREVIOUS SCAN |
| 28-30 | OH AND REV INTEGRATION COUNT | | |

| ALL ORIGINATING ANSWERED | |
|---|---|
| 2-8 | USAGE TIME COUNT OF ONE MINUTE REAL TIME (800 MACHINE SCANS) |
| 9-11 | USAGE TIME COUNT - PLURAL MINUTES OF REAL TIME |
| 12-22 | USAGE DATA = NO. OF DATA COUNTS TIMES SELECTED TIME PERIOD |
| | = MAXIMUM 2048 COUNTS TIMES SELECTED TIME PERIOD |
| 23 | USAGE DATA PARITY BIT |
| 24 | OVERTIME STATUS BIT (OSB) = 0 FOR INITIAL PERIOD |
| | = 1 FOR OVERTIME PERIOD |
| 31-41 | PEG DATA - 2048 MAXIMUM COUNTS |
| 42 | PEG DATA PARITY BIT |

| ALL ORIGINATING | |
|---|---|
| 43-54 | PEG DATA (AS BITS 31-42) |
| 67-76 | USAGE MINUTE COUNT (AS BITS 2-11) |
| 77-88 | USAGE DATA (AS BITS 12-23) |
| 89 | OVERTIME STATUS BIT (AS BIT 24) |

TABLE 1-continued

| | ALL OFF HOOK |
|---|---|
| 55–66 | PEG DATA (AS BITS 31–42) |
| 90–99 | USAGE MINUTE COUNT (AS BITS 2–11) |
| 100–111 | USAGE DATA (AS BITS 12–23) |
| 112 | OVERTIME STATUS BIT (AS BIT 24) |

The bits are not shown in numerical order, but are rather grouped according to function. As will subsequently be shown from the description of FIG. 5A, Status Bit 1, which is memory bit 25, is derived from the OH and REV signals as conditioned by the state of Status Bits 2 and 3 which respectively are memory bits 26 and 27. Memory bits 28 to 30 for each memory word contain the integration count for the incoming OH and REV signals to determine just how long each has been present for the line being examined, and in accordance with selectable times, the integration count will activate the updating circuitry. These control bits 25 through 30 are used to determine the start and completion of peg and usage counting functions for all three conditions which are monitored in the disclosed apparatus. That is, these same control bits are utilized whether the examination is taking place with respect to All Originating Answered conditions, All Originating conditions of All Off-Hook conditions.

The same number of bits are used for each function irrespective of whether that function is in connection with an All Originating Answered, and All Originating or an All Off-Hook line condition. For example, all of the peg data is contained in 12 bits, one of which is a parity bit, and similarly for the usage data. The usage time count for all of the monitored conditions is contained within 10 bits for each such condition, three of which bits represent minutes of real time in binary coded form with the other seven bits being used to count up to 800 machine scans which is the equivalent of one minute in real time. From Table 1 is observed that the peg and usage data and time counts for the usage data are all kept track of individually for each of the line conditions being monitored. In the present illustration three such line conditions are being described, but as many line conditions as desired may be monitored by merely providing additional bit positions in each memory word sufficient to accommodate the additional desired information, together with additional processing circuitry of the same kind as is to be now described.

PEG EVENT INCREMENTING - FIG. 5A

Considering first FIG 5A which shows the logic circuitry for incrementing the peg counts for all three of the monitored conditions, it is seen that the OH and REV signals are respectively routed to the A0 and A1 inputs of the Peg and Usage Status Programmable Read-Only Memory 5-1 and are also applied to and-gate 5-2 where a coincidence of both signals is gated through to Status Bit 1 gate 5-3 and is also applied as an inhibit signal to gate 5-4. The other input to gate 5-4 is memory bit 25 which shows the state of Status bit 1 during the previous scan. The output of gate 5-4 is routed as an inhibit signal to each of the three input integration count gates 5-5, 5-6 and 5-7, the other input to each of these gates being respectively bit 28, bit 29 and bit 30. The output of gates 5-5, 5-6 and 5-7 are routed to the counter inputs of Duration Counter 5-8, which counter has its count outputs routed to output integration count gates 5-9, 5-10 and 5-11.

These output integration gates are enabled to read the count-out back to the memory when enabled by a B1 output from Read Only Memory (ROM) 5-1, the B1 output signal also being presented as an input to each of and-gates 5-12 and 5-13. The B1 signal when present is passed through gate 5-12 if a B4 signal from ROM 5-1 is also not present, and this gated output passes through or-gate 5-14 to the add input of Duration Counter 5-8. Accordingly, whenever a B1 signal is present and a B4 signal is absent from ROM 5-1, the count of the duration counter is incremented by 1. When a B1 signal and B4 signal are both present from the ROM 5-1, gate 5-12 is inhibited and and-gate 5-13 is conditioned to pass a count therethrough by a T 4/3 timing signal if the switch 5-15 is in the illustrated T position. Since the T 4/3 timing signal is only present for one machine scan out of ten, a count signal passing through and-gate 5-13 can only be generated once each ten machine scans, and accordingly each count into the Duration Counter 5-8 would in such circumstance represent a time interval of ten machine scans rather than a single machine scan. If counting on every machine scan is desired, the switch 5-15 may be set to the S or single scan position, and this is in fact done for REV signal integration with sleeve and meter or sleeve only exchanges.

The outputs of the input integration count gates 5-5, 5-6 and 5-7 are also selectively strapped to gates 5-16 through 5-19 in such manner as to determine when particular counts will be gated through these gates to the inputs of Priority Encoder 5-20. The output of gate 5-16 drives the OHC input of Priority Encoder 5-20 when the Duration Counter 5-8 has generated a six count which corresponds to the seventh scan condition. This is so because gate 5-16 is driven from the input integration counter gates and not from the output integration counter gates. The outputs from the output integration counter gates are sent back to memory and will not appear at the input integration count gates until one complete machine scan later which will of course correspond to the next or seventh count.

Gate 5-17 has its output connected to the REVC input of Priority Encoder 5-20 and gates a signal through on the machine scan immediately after the count of 60. This gate is used in a count-by-ten mode in conjunction with gate 5-13 and the T 4/3 timing signal, as will be subsequently explained. Gates 5-18 and 5-19 both pass their outputs to the ONH input of Priority Encoder 5-20, gate 5-19 also requiring a B5 signal from ROM 5-1. The priority encoder input OHC stands for off-hook count, the input REVC stands for reversal count and the input ONH stands for onhook count. Gate 5-18 is designated as the Long On-Hook count gate and gate 5-19 as the Short On-Hook count gate, which terms will be amplified hereinafter. The numbers shown within the gates are the count which each gate passes, and these counts have been somewhat arbitrarily designated, and specific desired count being selectable by the appropriate input strapping of these gates 5-16 through 5-19 to the input integration count gates 5-5, 5-6 and 5-7.

The read-only memory ROM 5-1 is a function table device which generates at its outputs B0 through B7 a specific array of signals when its inputs A0 through A5 are presented with a particular array of signals, so that as the combination of input signals A0 through A5 changes in pattern, the output signals B0 through B7 also present a changing pattern. These specific corresponding input and output signal patterns of the ROM 5-1 together with the signal conditions of the gates 5-16 through 5-19 are shown in Table 2 and will be referred to subsequently herein in describing the manner in which the apparatus functions to carry out peg and usage counting.

The ROM output B0, when it occurs, increments the peg count in 11 Bit Adder 5-21 so that the peg count stored in memory bits 31 to 41 is increased by one. ROM output B3 is a Master Clear signal which is utilized in the usage counters shown in FIG 5B. ROM outputs B6 and B7 respectively show the integrated count status of the REV signal and the OH signal. When the OH signal has been present for six scans, the input conditions to the ROM 5-1 will be such that a B7 signal will be generated. When the OH and the REV signal have been present for more than sixty counts, the B6 signal will appear. When both the B6 and B7 signals are present, they together pass through and-gate 5-22 as an inhibit signal on gate 5-3 and suppress the Status Bit 1 signal.

The peg data for the All Off-Hook condition is incremented in 11 Bit Adder 5-23 while the peg data for All Originating calls is incremented in 11 Bit Adder 5-24, these adders being driven by signals which are presented through and-gates 5-25 and 5-26 and through or-gate 5-27. The ROM 5-1 is actually composed of a pair of 256 bit ROMS shown within the dashed line box designed as 5-1 at the right-hand side of FIG. 5A, the actual circuit logic connections being shown to the Priority Encoder 5-20. However, for clarity of explanation these actual pieces of hardware are shown in the representational form illustrated in interconnection with the other logic of FIG. 5A.

USAGE INTERVAL CIRCUITS - FIGS. 5B, 5C, 5D

FIG. 5B illustrates the usage interval circuits for incrementing usage for All Originating Answered calls, FIG. 5C represents the usage monitoring for All Originating calls irrespective of whether or not answered, and FIG. 5D illustrates the circuitry for monitoring the usage intervals for All Off-Hook line conditions. FIG. 5C and 5D differ only with respect to their input gating, the usage counting and incrementing apparatus being identical. Similarly the only difference between the circuitry of FIG. 5B and those of FIGS. 5C and 5D is in the input gating. In all cases it is the input gating which determines when it is proper to begin usage counting for the monitored condition. The input gate in FIG. 5B, gate 5-28 is an and-gate requiring the presence of the T 4/3 timing signal together with Status Bits 2 and 3 from the ROM 5-1. The presence of these signals, as will be subsequently seen, indicates that there has been a verified off-hook condition and a verified line reversal condition before usage counting commences.

The T 4/3 timing signal occurs once every 10 machine scans or once every 750 milliseconds so that a count of 800 such machine scans represents a real time interval of one minute, and this one minute counter is shown in FIG. 5B as Memory Scan Counter 5-29. The same timing count arrangement is shown in FIGS. 5C and 5D, in the former, the T 4/3 timing signal being gated with a B7 signal through gate 5-30, whereas in FIG. 5D, the T 4/3 timing signal is gated through and-gate 5-31 with the output of or-gate 5-32 which latter is in turn the recipient of either a B7 signal from ROM 5-1 or the output of and-gate 5-33 which produces an output in the presence of a B6 signal if there is no B7 signal. The B7 output signal from ROM 5-1 denotes, as previously described, the existence of a verified off-hook condition, and accordingly usage for such a verified condition is recorded by the circuits of both FIGS. 5C and 5D. Similarly, the presence of a B6 output signal from ROM 5-1 coupled with the absence of the B7 signal designates a reversed on-hook condition denoting an incoming call, and usage for these calls is recorded by the circuitry of FIG. 5D. Accordingly, since all of the remainder of the circuitry of FIG. 5B is common to that of FIGS. 5C and 5D, the description of FIG. 5B suffices for FIGS. 5C and 5D as well.

Turning now to a consideration of FIG. 5B, the output of gate 5-28 in addition to incrementing the count in Memory Scan Counter 5-29 is presented as one input to and-gate 5-34 and is presented as an enable signal to Initial Period and Overtime Units 3 Bit Comparators 5-35 and 5-36 respectively. The other input to and-gate 5-34 is derived from the 10 count output of counter 5-29, and the gated output appears as one input to and-gate 5-37, the output of which latter gate increments the Usage Counter 5-38 to increment the count of memory bits 12 to 22. The other input of gate 5-37 is derived from the output of and-gate 5-39 which has as its inputs respectively the output of and-gate 5-40 and or-gate 5-41. The inputs to or-gate 5-41 are the two Match outputs of the Comparators 5-35 and 5-36. The Match output of Comparator 5-35 is also routed to or-gate 5-42 whose output is the input to and gate 5-40. The other input to or-gate 5-42 is memory bit 24 which is also routed as an inhibit signal to Comparator 5-35 and as an enable signal to Comparator 5-36 when the bit is present, and which reverses function to act as a non-inhibitor for Comparator 5-35 and a non-permissor to Comparator 5-36 when the bit is absent.

Bit 24, as shown in Table 1, is the overtime status bit OSB for monitoring the usage of the All Originating Answered line condition. The Initial Period 3 Bit Comparator 5-35 has its A1, A2 and A3 inputs connected to a Period Selection device 5-43 so that selected inputs can be set into the A inputs designating the desired length of initial period which is to elapse before overtime usage counting is initiated. As shown, this initial period can be set illustratively for any time from 0 to 7 minutes. The Overtime Units 3 Bit Comparator 5-36 has a similar Period Selection device 5-44 connected to its A inputs so that overtime periods of from 1 to 7 minutes may be selected. The B inputs of each of the Comparators 5-35 and 5-36 receive count information from the bits stored in bit positions 9, 10 and 11 of each memory location, and when the count shown by the bits 9, 10 and 11 matches with the particular period selection which has been set into the comparators, an output is generated at the M output of the comparators.

The count information bits 9, 10 and 11 are also presented to the inputs of Minute Counter 5-45 which also receives its incrementing input from the 800 count output of Scan Counter 5-29. The 800 count output of Scan Counter 5-29 is also routed as an inhibit signal to gates 5-46 through which memory bits 2-8 are normally recirculated back to memory. The inhibit on gates 5-46 of course closes the gates so that zeros read back to memory to start the count over. Gates 5-46 are also inhibited by a Master Clear signal which is generated as the B3 output of ROM 5-1, this Master Clear signal also being applied as an inhibit to gate 5-40 to clear the overtime status bit 24. Finally, the Master Clear signal is routed through or-gate 5-47 as an inhibit signal on Minute Counter output gates 5-48, 5-49 and 5-50 so that the output count of Minute Counter 5-45 on bit lines 9, 10 and 11 is returned to zero to clear the incremented count information for that particular input line and terminate the counting of overtime units by Comparator 5-36. When the Master Clear signal occurs, Status Bits 2 and 3, which are the B6 and B7 outputs of ROM 5-1, will be lost so that the input gate 5-28 will no longer be able to place a count into Memory Scan Counter 5-29.

PEG AND USAGE INCREMENTING - FIGS. 5A, to 5D, TABLE 2

Referring now to Table 2 in conjunction with the logic diagrams of FIGS. 5A and 5B, it is observed that the states of ROM function table 5-1 are shown for a tip and ring exchange together with the states of the Priority Encoder 5-20 inputs, Status Bit 1 and the overtime statuc bit OSB bit 24, all for a single subscriber line on successive machine scans of that line. Lines 0-12 of Table 2 show the complete sequence of events for an originating answered call, lines 14-16 show a reversed on-hook sequence, lines 18-23 show the sequence for both the all originating and all offhook cases, while lines 25-30 show the incoming call sequence.

Considering first that the line being examined was in an idle state, line 0 of Table 2 shows that all of the inputs and

TABLE 2

| LINE | Aφ OH | A1 RSV | A2 RSB2 | A3 RSB3 | A4 | A5 | SB1 | OHC | REVC | SONH | LONH | B7 | B6 | B5 | B4 | B3 | B1 | Bφ | OSB | PEG AND USAGE STATUS STATES OF ROM FUNCTION TABLE 5-1 FOR TIP AND RING EXCHANGE |
|---|---|---|---|---|---|---|---|---|---|---|---|---|---|---|---|---|---|---|---|---|
| | | | | | | | | | | | | | | | | | | | | (1) ALL ORIGINATING ANSWERED CALLS |
| φ | 0 | 0 | 0 | 0 | 0 | 0 | 0 | 0 | 0 | 0 | 0 | 0 | 0 | 0 | 0 | 0 | 0 | 0 | 0 | LINE IDLE |
| 1 | 1 | 0 | 0 | 0 | 0 | 0 | 0 | 0 | 0 | 0 | 0 | 0 | 0 | 0 | 0 | 0 | 0 | 0 | 0 | OH SCAN 1 |
| 2 | 1 | 0 | 0 | 0 | 0 | 0 | 1 | 1 | 0 | 0 | 0 | 1 | 0 | 0 | 0 | 0 | 0 | 0 | 0 | OH SCAN 6 |
| 3 | 1 | 1 | 1 | 0 | 0 | 0 | 1 | 0 | 0 | 0 | 0 | 1 | 0 | 0 | 0 | 0 | 0 | 0 | 0 | SET SB2 |
| 4 | 1 | 1 | 1 | 0 | 0 | 0 | 1 | 0 | 0 | 0 | 0 | 1 | 0 | 0 | 0 | 1 | 0 | 0 | 0 | REV SCAN 1 - COUNT EVERY 10 SCANS |
| 5 | 1 | 1 | 1 | 0 | 0 | 0 | 1 | 0 | 0 | 0 | 0 | 1 | 1 | 0 | 0 | 1 | 0 | 0 | 0 | REV SCAN 7* |
| 6 | 1 | 1 | 1 | 0 | 0 | 0 | 1 | 0 | 0 | 0 | 0 | 1 | 1 | 1 | 0 | 1 | 0 | 0 | 0 | REV SCAN 60 |
| 7 | 1 | 1 | 1 | 0 | 0 | 0 | 1 | 0 | 0 | 0 | 0 | 1 | 1 | 1 | 1 | 1 | 0 | 0 | 0 | REV SCAN 61-70, INCREMENT PEG COUNT (1) |
| 8 | 1 | 1 | 1 | 1 | 0 | 0 | 1 | 0 | 0 | 0 | 0 | 1 | 1 | 1 | 1 | 1 | 0 | 0 | 0 | START USAGE INITIAL PERIOD COUNT** |
| 9 | 1 | 1 | 1 | 1 | 1 | 0 | 1 | 0 | 0 | 0 | 0 | 1 | 1 | 1 | 1 | 1 | 0 | 0 | 1 | INITIAL PERIOD COMPLETED - START OVERTIME |
| 10 | 1 | 1 | 1 | 1 | 1 | 0 | 1 | 0 | 0 | 0 | 0 | 1 | 1 | 1 | 1 | 1 | 1 | 0 | 1 | COMPLETED CALL - START SONH INTEGRATION |
| 11 | 1 | 1 | 1 | 1 | 1 | 1 | 1 | 0 | 0 | 1 | 0 | 1 | 1 | 1 | 1 | 1 | 1 | 0 | 1 | SONH COMPLETED - TERMINATE USAGE COUNT |
| 12 | 0 | 0 | 0 | 0 | 0 | 0 | 0 | 0 | 0 | 0 | 0 | 0 | 0 | 0 | 0 | 0 | 0 | 0 | 0 | LINE IDLE |
| 13 | 0 | 1 | 0 | 0 | 0 | 0 | 0 | 0 | 1 | 0 | 0 | 0 | 0 | 0 | 0 | 0 | 0 | 0 | 0 | REVERSED ON HOOK CONDITION |
| 14 | 0 | 1 | 1 | 0 | 0 | 0 | 0 | 0 | 0 | 0 | 1 | 0 | 1 | 0 | 0 | 0 | 1 | 0 | 0 | CALLED PARTY TERMINATES - START LONH |
| 15 | 0 | 1 | 1 | 0 | 0 | 0 | 0 | 0 | 0 | 0 | 1 | 0 | 0 | 0 | 0 | 0 | 1 | 0 | 0 | LONH COMPLETED - TERMINATE USAGE COUNT |
| 16 | 0 | 0 | 0 | 0 | 0 | 0 | 0 | 0 | 0 | 0 | 0 | 0 | 0 | 0 | 0 | 0 | 0 | 0 | 0 | LINE IDLE |
| 17 | | | | | | | | | | | | | | | | | | | | (2) ALL ORIGINATING AND (3) ALL OFF HOOK |
| 18 | 1 | 0 | 0 | 0 | 0 | 0 | 0 | 0 | 0 | 0 | 0 | 0 | 0 | 0 | 0 | 0 | 0 | 0 | 0 | OH SCAN 1 |
| 19 | 1 | 0 | 0 | 0 | 0 | 0 | 1 | 1 | 0 | 0 | 0 | 1 | 0 | 0 | 0 | 0 | 0 | 0 | 1 | OH SCAN 6 - PEG COUNT (2) & (3) - START USAGE BOTH |
| 20 | 1 | 1 | 0 | 0 | 0 | 0 | 1 | 0 | 0 | 0 | 0 | 1 | 0 | 0 | 0 | 0 | 1 | 0 | 0 | CLOSE GATE 5-25 , A2≠0 |
| 21 | 1 | 1 | 0 | 0 | 0 | 0 | 1 | 0 | 0 | 0 | 1 | 1 | 0 | 0 | 0 | 0 | 1 | 0 | 0 | START LONH |
| 22 | 1 | 1 | 0 | 0 | 0 | 0 | 1 | 0 | 0 | 0 | 1 | 1 | 0 | 0 | 0 | 0 | 1 | 0 | 0 | LONH COMPLETED - TERMINATE USAGE COUNT |
| 23 | 0 | 0 | 0 | 0 | 0 | 0 | 0 | 0 | 0 | 0 | 0 | 0 | 0 | 0 | 0 | 0 | 0 | 0 | 0 | LINE IDLE |
| 24 | 0 | 0 | 0 | 0 | 0 | 0 | 0 | 0 | 0 | 0 | 0 | 0 | 0 | 0 | 0 | 0 | 0 | 0 | 0 | INCOMING CALL |
| 25 | 1 | 0 | 0 | 0 | 0 | 0 | 0 | 0 | 0 | 0 | 0 | 0 | 0 | 0 | 0 | 0 | 0 | 0 | 0 | REV SCAN 1 |
| 26 | 1 | 0 | 0 | 1 | 0 | 0 | 0 | 0 | 0 | 0 | 0 | 0 | 0 | 0 | 0 | 1 | 0 | 0 | 1 | REV SCAN 6, PEG COUNT (3) - START USAGE (3) |
| 27 | 1 | 0 | 0 | 1 | 1 | 0 | 0 | 0 | 0 | 0 | 0 | 0 | 0 | 0 | 0 | 1 | 0 | 1 | 0 | CLOSE GATE 5-26 , A3≠0 |
| 28 | 0 | 0 | 0 | 0 | 1 | 0 | 0 | 0 | 0 | 0 | 1 | 0 | 0 | 0 | 0 | 1 | 0 | 1 | 0 | START LONH - CALL COMPLETED |
| 29 | 0 | 0 | 0 | 0 | 1 | 0 | 0 | 0 | 0 | 0 | 1 | 0 | 0 | 0 | 0 | 0 | 0 | 1 | 0 | LONH COMPLETED - TERMINATE USAGE COUNT |
| 30 | 0 | 0 | 0 | 0 | 0 | 0 | 0 | 0 | 0 | 0 | 0 | 0 | 0 | 0 | 0 | 0 | 0 | 0 | 0 | LINE IDLE |

FOR SLEEVE ONLY OR SLEEVE AND METER
*REV SIGNAL A1 GOES TO 0 STATE AND GIVES PEG COUNT
**REV SIGNAL A1 GOES TO 0 STATE BUT USAGE INTEGRATION CONTINUES outputs of ROM 5-1 and the inputs to Priority Encoder 5-20 are 0. When now the subscriber goes off-hook to place a call, as shown in line 1 of Table 2 the A0 ROM input goes to 1 which causes the generation of a B1 ROM output. The B1 output enables the counter output gates 5-9 to 5-11 and passes through gates 5-12 and 5-14 to increment Counter 4-8 and causes a "one" count to be sent back to memory in bit 28, bits 29 and 30 remaining as zeros.

For the next four times that the subscriber line is looked at the continued presence of the OH signal keeps the ROM A0 signal at 1 and generates four more counts from Counter 5-20. Accordingly, on the sixth scan, a five count is presented to OHC gate 5-16 by bits 28 and 30 via input counter gates 5-5 and 5-7 which causes an OHC input to Priority Encoder 5-20 which thereupon generates an A4 input to ROM 5-1, in turn causing a B7 output, all as shown in line 2 of Table 2. The A4 and OHC signals are not stored signals but the B7 signal is Status Bit 2 and is sent to memory as bit 26.

On the next scan, the bit 26 SB2 signal appears as the A2 input, as shown in line 3, representing the occurrence of a valid off-hook signal. The signal states remain static until the called party answers the call by going off-hook, at which time a REV signal appears, thereby generating an SB1 signal via gate 5-3 and inhibiting gate 5-4. The presence of the A0, A1 and A2 input signals to ROM 5-1 generates B1 and B4 signals and maintains the B7 signal, as shown in line 4 of Table 2. As previously described the B1 and B4 signals close gate 5-12 and enable gate 5-13 to cause a count increment every ten scans. On scan 60, gate 5-16 passes a signal to Priority Encoder 5-20 which generates an A4 signal which is ignored by ROM 5-1 as is shown in line 6 of Table 2. However, on the next scan, gate 5-17 passes a count signal to the Priority Encoder REVC input which generates an A5 input to ROM 5-1.

The combination of ROM inputs A0, A1, A2 and A5 causes the output generation of B0, B3, B6 and B7 signals as shown in line 7 of Table 2. The B6 and B7 signals designate that a valid line reversal has occurred after a valid off-hook and that a peg count should be recorded and usage counting commenced. The B0 signal routed to Adder 5-21 in fact increments the peg count stored in memory bits 31-41, and the B3 signal routed to gates 5-40, 5-46 and 5-47 respectively of FIG. 5B insures that the OSB bit 24 is cleared to 0 and that the Memory Scan counter output gates and Adder output gates are closed to clear bits 2-11 to $\phi$. The Table 2 line 7 note indicates that the REVC gate 5-17 passes its signal at some time between scans 61 and 70, and this is so because it is not possible to determine the scan displacement of the T 4/3 signal from the time that the B4 and B1 signals first appear.

The B6 and B7 signals, which are memory bits 27 and 26 respectively, appear at and-gate 5-28 in FIG. 5B, and when the next machine scan occurs during which a T 4/3 timing signal is present, pass through the gate to increment the Memory Scan Counter 5-29 and cause its count to change from 0 to 1. The output of gate 5-28 also appears as one input to and-gate 5-34 which latter gate cannot pass the signal because the count which was in the Memory Scan Counter 5-29 was not a ten count, and additionally because the output of gate 5-34 is presented as one input to gate 5-37 which in turn requires another input from gate 5-39, and an output from gate 5-39 will only occur in the presence of the match condition from Comparator 5-35 or 5-36 together with the presence of a bit 24 overtime status bit. The reason for this is that gate 5-37 passes the incrementing count to the Usage Counter 5-38, and no such incrementing count should be passed until the overtime usage period commences. This can occur as early as the next scan on which a T 4/3 timing signal appears provided that the Initial Period Comparator 5-35 has had its period selection set for zero minutes by Selector 5-43.

In the event that the initial period selection had been set at zero minutes, bits 9, 10 and 11, which are of course all in the zero state, would immediately produce a match in the Initial Period Comparator 5-35 and would generate the M output signal because the comparator has been enabled by the output of gate 5-28. The M output passes through or-gate 5-42 to and-gate 5-40 and passes therethrough as the overtime status bit since, on this next scan, the B3 Master Clear signal has disappeared and gate 5-40 is no longer inhibited. Bit 24 is now applied as one input to and-gate 5-39 which receives its second input from the match signal M output of Comparator 5-35 which has passed through or-gate 5-41. The output of gate 5-39 is then routed as one input to and-gate 5-37, the other input of which comes from and-gate 5-34 because the previous scan output from and-gate 5-28 had set a ten count into Memory Scan Counter 5-29 so that this next input from and-gate 5-28 passes through and-gate 5-34. Accordingly, the Usage Counter 5-38 increments the usage count in memory bits 12-22.

The Memory Scan Counter 5-29 in reality counts up to eighty, each count representing ten scan times because a count is received only when the T 4/3 timing signal is present. Therefore the count of eighty in Memory Scan Counter 5-29 represents 800 machine scans of 75 milliseconds each or a real time count of one minute. Since the overtime status bit, memory bit 24, has now been set, when it appears on the next scan during which an input from gate 5-28 is possible, it inhibits Initial Period Comparator 5-35 and acts as the second enabling signal for Overtime Units Comparator 5-36. Since the minute count in memory bits 9, 10 and 11 is at this time still zero, it is not possible to achieve a match from Overtime Units Comparator 5-36 because the minimum overtime period selection is shown to be one minute.

Assuming that the overtime period has been selected at two minutes, nothing will occur in the Overtime Comparator 5-36 until the Memory Scan Counter 5-29 has counted up to 800 twice and has accordingly placed a two count into the Minutes Adder 5-45 which will then appear on the memory bit 9, 10 and 11 lines to produce a match in Overtime Units Comparator 5-36. At that time, Comparator 5-36 generates an M signal which passes through or-gate 5-41 to and-gate 5-39 where it is gated through by the overtime status bit 24 to and-gate 5-37. This input to and-gate 5-37 is gated through by the output of and-gate 5-34 to set a second count into Usage Counter 5-38 and increment memory bits 12-22.

The Memory Scan Counter 5-29 count bits 2-8 had of course been set back to zero by the 800 count output of Memory Scan Counter 5-29 applied as an inhibit signal to the counter output gates 5-36. The minute count bits 9, 10 and 11 are also set back to zero by the inhibit signal on output gates 5-48, 5-49 and 5-50 applied thereto through or-gate 5-41 from the match M output of Overtime Comparator 5-36. Accordingly, a new overtime unit commences to be timed, and this cycle will repeat continuously each two minutes as long as the conversation continues on the subscriber line. Of course, if the Overtime Comparator Period Selector 5-44 had been set at some other overtime period, such as three or six minutes, then the Usage Counter 5-38 would be incremented only at the end of each such overtime selected period.

It should be noted that the Usage Counter 5-38 is incremented only to measure the number of overtime units and does not record anything for the initial period of time, whatever that initial period may have been set to be. As just described, it is observed that the first count into the Usage Counter 5-38 occurs at the end of the initial period comparision so that each usage count measures each successive overtime unit or fraction thereof. Line 8 of Table 2 shows the ROM function table signal conditions at the start of the usage period during the initial period before the overtime status bit had been set, while line 9 of Table 2 shows the same signal conditions at the end of the initial period and the beginning of the overtime period when the overtime status bit has now been set.

After the call has been completed with the recording of however many overtime usage units have occurred, the calling and called parties go back on-hook so that the OH and REV signals are lost, thereby changing the ROM input signal pattern to show only the presence of the A2 and A3 inputs which causes the output signal pattern to change so that the signals B1, B5, B6 and B7 appear. The B1 signal initiates a count in Duration Counter 5-8 through gate 5-12, and signal B5 enables short on-hook gate 5-19 to look for a count of 4 from counter input gate 5-7 in order to generate an ONH input to Priority Encoder 5-20.

The short on-hook gate 5-19 provides the on-hook integration determination whenever Status Bits 2 and 3, memory bits 26 and 27, are true and an on-hook condition occurs. In all other cases, a long on-hook integration will take place through gate 5-18 because the ROM output signal B5 will not be generated. The distinction between the short on-hook and the long on-hook situation is made because of differing call termination signal conditions which occur on telephone lines, and these conditions must be taken into account for telephone company purposes.

On the fifth scan after initiation of the short on-hook count, gate 5-19 passes a signal to the Priority Encoder which in response thereto generates the A4 and A5 outputs resulting in the ROM signal pattern shown on line 11 of Table 2. The completion of the on-hook integration suppresses the B6 and B7 signals, generates a B3 signal and maintains the B5 signal. The loss of the B6 and B7 Status Bits 2 and 3 closes the input gate 5-28 to the usage counting circuits of FIG. 5B and terminates the usage count. The B3 signal clears out the usage counting bits 2 through 11 and the overtime status bit 24, all as previously described. The loss of the B1 signal clears out the duration counter bits 28, 29 and 30. On the next scan, the line is shown to be in idle condition.

Line 14 of Table 2 illustrates the changed function table conditions of the ROM 5-1 when a reversed on-hook line condition occurs under the circumstance when the called party goes on-hook before the calling party does so. When this occurs, a reversed on-hook condition occurs on the line which translates as the absence of the OH signal and the presence of the REV signal. At this time, the B1 output is again generated, but the B5 output signal is not generated. Accordingly, short on-hook gate 5-19 is not enabled and the on-hook integration count is examined for by the long on-hook gate 5-18. When a six count is detected on the seventh scan by gate 5-18, the Priority Encoder 5-20 generates the A4 and A5 signals which together with the A1, A2 and A3 signals cause the ROM to generate a B3 output and terminate the B6 and B7 signals. The B3 output clears out the time counting registers in FIG. 5B and the overtime status bit, memory bit 24, all as shown in line 15 of Table 2. The line returns to the line idle condition subsequently as is shown in line 16 of Table 2.

Lines 18 through 23 illustrate the recording of peg and usage data in connection with monitored line conditions of All Originating and All Off-Hook, the All Originating peg data being incremented in Adder 5-24 while the All Off-Hook peg data is incremented in Adder 5-23, the usage data being accumulated in the apparatus previously described in connection with FIGS. 5C and 5D. Line 18 shows the same ROM conditions as have already been described in line 1 of Table 2 in connection with the All Originating Answered monitored line condition, and line 19 shows the same conditions as already described in connection with line 2 of Table 2 at the completion of the OH integration. However, at the end of the OH integration shown in line 19, the overtime status bits 89 and 112 are set, a peg count is entered in each of Adders 5-23 and 5-24, and a usage count is commenced in both FIGS. 5C and 5D because the B7 signal has been generated from the ROM 5-1.

The peg count is incremented through and-gate 5-25 at the point in time where the B7 signal arises, because as is also shown on the gate 5-25 the B6 signal is absent, and the Status bit 2 has not yet arisen since B7 is being read back into memory and will not appear as the SB2 signal until the following scan. On the following scan, when SB2 appears, as shown in line 20 of Table 2, gate 5-25 is closed so that no further peg counts can be entered during the then current usage recording cycle. Usage counting is of course carried out because gate 5-30 is enabled in FIG. 5C, and gate 5-31 is enabled in FIG. 5D, both by the presence of the B7 signal. When subsequently the OH signal is lost, the ROM A0 input goes down and B1 and B7 ROM outputs are generated as shown in line 21 of Table 2 to start a long on-hook count. When this is completed, the A4 and A5 ROM inputs are generated by the Priority Encoder 5-20 as shown in line 22 of Table 2 to thereby generate the B3 output and clear out the time counters. The line thereafter returns to the line idle state as shown in line 23 of Table 2.

Lines 25 through 30 illustrate the sequence of events for an incoming call, and it is observed from the A0 and A1 bits of line 25 that an incoming call appears as a line reversal signal having the OH signal present and the REV signal present. This causes the generation of the B1 output from ROM 5-1 to start the reversal integration count. It should be noted that in this case the B4 signal is not generated so that the integration count proceeds through gate 5-12 on every scan, and does not take place through gate 5-13 on each tenth scan. When a six count is received on the seventh scan cycle by Priority Encoder gate 5-17, an A5 signal is generated which together with the A1 signal causes the ROM 5-1 to generate B3 and B6 output signals to clear the usage time counters and start a usage count in FIG. 5C through gate 5-33 because, as is seen in line 26 of Table 2, there is no B7 output signal present.

The presence of the B6 output signal together with the absence of the B7 output signal on and-gate 5-26, and the fact that the B6 signal has not yet been recirculated through memory to appear as the Status Bit 3, gates through and-gate 5-26, passing through or-gate 5-27 and incrementing the count in the All Off-Hook adder 5-23 to increment the count in memory bits 55-65. During the next scan, when Status Bit 3 signal appears as shown in line 27 of Table 2, gate 5-26 is inhibited so that no further peg count can be entered during the then currently being recorded usage count for the monitored condition. When thereafter the call is terminated and the A0 and A1 signals are lost, the ROM 5-1 generates a B1 signal and starts a long on-hook count integration, as shown in line 28 of Table 2. When the long on-hook integration has been completed the A4 and A5 signals are generated as shown in line 29 and the B3 Master Clear output signal is generated from the ROM 5-1 as shown in line 29 of Table 2, the line returning to line idle condition on the subsequent scan as shown in line 30 of Table 2.

The function of gate 5-4 is to prevent an outgoing answered call from being mistaken as an incoming call, because in present day billing practices incoming calls are not billed to the account of the called party, and accordingly the outgoing answered call which should be a billed item would be lost. The problem arises under the circumstance where the calling party has gone off-hook for a sufficient length of time to cause the Status Bit 2 to be set as a result of a validated off-hook signal, followed by the commencement of the timing interval in which the equipment is looking for a valid reversal signal so that it will then generate a peg count and initiate usage counting for billing purposes. If the reversal integration count has commenced, and the calling party then causes a line open condition to occur, as for example by slightly turning the dialing mechanism, both the OH and the REV signals will be lost and the ROM 5-1 will interpret this as a terminated conversation and initiate a long on-hook count, which if allowed to proceed to completion will prevent a peg count and usage incrementing from then taking place. If the reversal integration count had proceeded to a count of perhaps 4 at the time that the long on-hook count commences, the situation would be as follows.

When the line-open condition occurs, the telephone company equipment automatically starts to time the line-open circuit, and if 250 milliseconds elapses with the line condition remaining open, the telephone equipment will automatically disconnect the line. If however the line-open condition is released before the completion of the 250 millisecond disconnect period, the line connection is maintained. Since a reversal count of 4 or more might have existed at the time that the line-open condition occurred, it would only require an additional 2 counts on the bit 28, 29 and 30 lines to make the long on-hook gate 5-18 believe that a valid on-hook condition had occurred and clear the ROM 5-1 back to an apparent line idle condition. The actual additional 2 count incrementing would occur and be presented to gate 5-18 within 3 scan times or 225 milliseconds. This is less than the telephone company disconnect time, and while the disconnect does not take place, the peg and usage circuits would never have been activated.

Such an occurrence is prevented by gate 5-4 in the following way. Since the OH and REV signals were both present before the line-open condition occurred, and since the reversal integration had not been completed and accordingly no B6 signal is present, a Status Bit 1 signal is generated via the and-gates 5-2 and 5-3, and appears as the input to gate 5-4. So long as both the OH and REV signals remain, gate 5-4 is inhibited by the output of and-gate 5-2, and the counting proceeds in the manner previously described for duration counts. However, when the line-open condition occurred, the OH and REV signals were lost so that there was no output from and-gate 5-2 to maintain the inhibit condition on gate 5-4. Accordingly, Status Bit 1 returning from memory bit location 25 passes through gate 5-4 and inhibits integration counting gates 5-5, 5-6 and 5-7, thereby clearing the count in memory bits 28, 29 and 30 back to a 0 count. Consequently, when the line-open condition occurs, the long on-hook integration count is constrained to start from a 0 count and cannot build upon any previous count which had been present from a partial reversal integration counting. Since the long on-hook count requires 375 to 425 milliseconds before such a count can be completed, the telephone company equipment will already have timed out at 250 milliseconds and disconnected the line.

PROCESSING VERIFIER - FIGS. 10 THROUGH 15

The Processing Verifier shown in the overall block diagram of FIG. 1 as functional block 10 generates a programmed sequence of tests signals which are connected to selected input circuits of each of the scan multiplexers where they are then processed through the apparatus and stored in the active memory. The data so stored derived from the test signal is then compared with the check register master peg and usage registers for accuracy to determine whether or not processing of the generated test signals was accurate. The program and control aspects of the Processing Verifier are shown in FIG. 10A while the actual data verification logic is shown in FIG. 10B, both being illustrated in connection with checking of monitored line data for All Originating Answered calls. Duplicate apparatus may also be provided to monitor the test data generated for the other illustrated monitored conditions, that is, for All Originating line conditions and for All Off-Hook conditions. The duplicate circuitry is shown merely as equivalent functional blocks in FIGS. 10A and 10C.

A detailed logic diagram of the Call Simulator of FIG. 10A is shown in FIG. 11, and the apparatus for producing tip and ring signals or sleeve and meter signals or sleeve only signals are shown in FIGS. 12A, B, C. The Check Register Address Table which determines that a particular memory address is one containing test data so that a comparison is to be made is shown in the logic of FIG. 13. FIG. 14 shows the timing signals generated by the Check Register Timing Generator of FIG. 10A, and FIGS. 15A and 15B illustrate typical 16 minute test sequences generated by the Call Simulator of FIG. 10A for the monitored condition of All Originating Answered calls. After describing the apparatus and waveforms shown in FIGS. 10 through 15, the manner of utilizing the verifying system to detect and isolate malfunctions in the equipment will be discussed.

PROGRAM AND CONTROL - FIG. 10A

Considering first FIG. 10A there is observed a 128 step Program Call Simulator 10-1 which generates a pair of binary coded output signals called the Test OH and the Test REV signals which are presented to either a tip and ring Waveform Simulator 10-2A or a sleeve and meter Waveform Simulator 10-2B or a sleeve only Waveform Simulator 10-2C. The particular waveform simulator which is connected to the Test OH and Test REV outputs of Call Simulator 10-1 is determined by whether the exchange to which the equipment is connected is a tip and ring exchange or a sleeve and meter exchange or a sleeve only exchange. The output signals from these waveform simulators have already been discussed and are shown in FIGS. 9A, 9B and 9C.

The program generated for the Call Simulator 10-1 for tip and ring equipment is shown in FIG. 15A, whereas th program generated by the Call Simulator 10-1 for a sleeve and meter or sleeve only exchange is shown in FIG. 15B, to be subsequently referred to. Since two other types of line conditions are monitored in the illustrated apparatus according to this invention, provision is made to also establish test simulation programs for such monitored conditions, the All Originating call simulator being shown in block form as 10-1A and the All Off-Hook call simulator being designated as 10-1B. Both of these simulators function in exactly the same manner as Call Simulator 10-1 but with appropriate programs suitable for adequately testing those particular line conditions.

Call simulator 10-1 also has a synchronizing timing ouput designated as SYNCH which is routed to a Check Register Timing Generator 10-3, which later generates three timing signals utilized in the data checking circuits of FIG. 10B. As will be seen in the discussion of the Call Simulator circuitry of FIG. 11, the SYNCH signal is time locked with the TC signal which comes from the Primary Timing Generator so that the SYNCH signal in turn locks the Check Register Timing Generator outputs in synchronism with the timing of the Primary Timing Generator.

The TS signal outputs from the Waveform Simulators 10-2A, 2B or 2C are connected to the scan multiplexer inputs as shown on the overall block diagram FIG. 1. These TS signals after processing and storing in memory will be presented for comparison as bits 12-22 and bits 31-41 in the Processing Verifier data checking circuitry shown in FIG. 10B which will be subsequently described. However, in order for the checking of these bits to take place, it must be determined that the bits being presented for data checking are in fact data bits from one of the subscriber lines to which a TS signal has been injected. This determination is made by the Check Register Address Table 10-4 and the Address Comparator 10-5 of the Processing Verifier program and control circuitry shown on FIG. 10A.

The Check Register Address Table 10-4, whose circuitry is shown in detail in the expanded logic diagram of FIG. 13, has stored within it the addresses of all of the input scan multiplexer lines to which are connected the TS test signals, in the illustrated case this being 20 subscriber lines per bank of 1000 lines. Accordingly, a separate Check Register Address Table would be used for each input interface bank of 1000 lines. If desired however, a 160 address check register could be used to cover the entire eight interface banks in the terminal, and an address comparator would then be utilized having additional comparator inputs to cover the "thousands" addresses. However, the present illustration assigns a Check Register Address Table to each 1000 line interface bank, and accordingly addresses from 0 to 999 are all that are required.

The Address Table 10-4 is initially synchronized by the timing circuits with the Primary Timing Generator so that the first output which appears as an address sent to the Address Comparator 10-5 is the address of the first subscriber line to which a test signal has been applied. As seen in FIG. 10A, the address in the Address Table 10-4 remains static until a match or M output from Address Comparator 10-5 occurs, whereupon the M output is recirculated back to the Check Register Address Table input gate 10-6 and is gated through by a C3 clock pulse to step the Check Register Address Table to its next address. The M output only occurs when the continually changing current address inputs from the Primary Timing Generator match up with the address then in the Address Table 10-4. When such a match occurs, the Comparator 10-5 generates the M output to change the Check Register Address Table to the next address during the next bit time, and applies the M signal to gate 10-7.

And-gate 10-7 requires the presence of signals from both or-gates 10-8 and 10-9, together with the absence of a transfer T signal from the Input Command Decode And Control Block 1D, in order to allow the M signal to be passed through the gate. Gate 10-8 provides a continuity signal from the memory bank then being examined, which continuity signal is in fact the Bank Select signal for that particular bank. The Bank Select signal is routed through a conductive path through the memory bank to gate 10-8, and in the absence of a memory bank there will be no such enabling signal on gate 10-7 so that no data examination can occur. Obviously, if the memory bank were absent there would necessarily result a mismatch of data in the data checking circuits and an error signal would be generated which would itself be an erroneous signal since there would have been no data actually being checked.

Similarly, or-gate 10-9 passes continuity signals through each of the Interface Boards 10-10 and 10-11 so that in the absence of such an interface board the gate 10-7 is again not permitted to pass the M signal from Address Comparator 10-5. Interface Board 10-10 receives its continuity signal from and-gate 10-12 and Interface Board 10-11 receives its continuity signal from and-gate 10-13. Gates 10-12 and 10-13 each receive Board and Bank Enable signals and the Row Enable 0-4 signals via or-gate 10-14. Gate 10-12 and its counterparts generate the continuity signals for the even numbered boards, while gate 10-13 and its counterparts generate the continuity signals for the odd numbered boards.

The T signal inhibits data checking because during a transfer, the data read out of the active memories is not only transferred to the passive memories, but the active memory positions are cleared so that all zeros are read back into the active memory and are simultaneously being presented to the Processing Verifier block 10. Accordingly, the data checking circuits also have to be cleared back to zero and checking is inhibited until the transfer has been completed.

DATA CHECKING - FIGS. 10B, 10C, 14A, 14B, 15A, 15B

The Processing Verifier data checking circuitry of FIG. 10B includes period selection devices and comparators which function in the same way as these same components illustrated in the usage counting circuits of FIG. 5B. That is, the Period Selection device 10-15 places a preset count from 0 to 7 in the three A inputs of Initial Period Comparator 10-16 while the Period Selection device 10-17 places a preselected minute count from 1 to 7 in the A inputs of Overtime Units Comparator 10-18. The B inputs to Comparators 10-16 and 10-18 are not supplied from memory bits, but are derived from a 0 to 7 Minute Counter 10-19 which receives count inputs once a minute via the 60 SEC. signal generated from Check Register Timing Generator 10-3 shown on FIG. 10A.

The reset input of Counter 10-19 is activated by the comparator match outputs of both of the Comparators 10-16 and 10-18, and also by the Test Peg signal which occurs once in every 16 minute Call Simulator Program as shown in the timing waveform diagram of FIG. 14A, the Test Peg signal also being generated by the Check Register Timing Generator 10-3. The Test Peg signal is also the Count input to Master Peg Register Counter 10-21 and is routed to the restore input of flip-flop 10-22, which latter has its set input driven by the output of reset or-gate 10-20.

The match output of Overtime Units Comparator 10-18, in addition to resetting Minute Counter 10-19 is also routed to Master Usage Register Counter 10-23 as the Count input thereto. The selection of the Initial Period Comparator 10-16 or the Overtime Units Comparator 10-18 as the comparator to be in the counting mode is determined by the Test Usage signal and by the presence or absence of the Q output from flip-flop 10-22 and the and-gates 10-24 and 10-25.

The outputs of the Master Peg Register 10-21 are routed to Peg Data Comparison Comparator 10-26 and also to the Master Register Multiplexer 10-27, while the outputs from Master Usage Register 10-23 are routed to Usage Data Comparison Comparator 10-28 and to the Master Register Multiplexer 10-27. When the Comparators 10-26 and 10-28 are enabled by the GM signal output of gate 10-7, a comparison is carried out between the master register counts and the peg and usage data counts coming in from the memory in bit positions 31-41 and 12-22 respectively. So long as the data matches, no Comparator M signal is generated by the comparators so that no error alarm is generated by Error Alarm Multiplexer 10-29. However, if comparison does not occur, the M signal is generated by either or both of the outputs of Comparators 10-26 and 10-28.

When the ROPV signal is received from the Read-Out Control 1H it causes a read-out from the stores of Multiplexers 10-27 and 10-29 of the data contents of the Registers 10-21 and 10-23 and any alarm signals from Comparators 10-26 and 10-28 which had been placed therein during the last memory transfer. The test data for the entire terminal of eight interface banks is thus available in repetitive 75 millisecond time intervals, which of course is much shorter than the actual read-out time required through the Output Buffer arrangement. With all of the data for each check register in the terminal available, together with the indication of whether or not an error is present in that particular check register location, it is possible for very quick diagnostic analysis of the nature and location of a large number of malfunctions in the terminal, so that very rapid repair may be effected, generally by merely replacing a plug-in card or module. Checking diagnosis of malfunctions will be discussed more fully hereinafter, but it will be more conducive to a complete understanding of the apparatus to first complete the consideration of FIG. 10B in conjunction with the truth table of FIG. 12 and the waveform diagrams of FIGS. 14 and 15.

The truth table of FIG. 12 shows what the simulated output line condition which appears as the TS signal will be as a function of the simulator inputs received from Program Call Simulator 10-1. If both the Test OH and Test REV lines are zeros, the simulated condition is an on-hook condition; if the Test OH signal is a 1 and the Test REV signal is 0 then the simulated condition is an off-hook condition; if both the Test OH and Test REV signals are "ones" then the simulated condition is that of line reversal; and when the Test OH signal is 0 and the Test REV signal is a 1 then the simulated line condition is that of a reversed on-hook.

These combinations of Test OH and REV signals are shown in FIG. 15A for a tip and ring lead waveform simulator in which it is seen that minute 1 of the 16 minute program consists of 64 equal intervals numbered 0 to 63, each interval being 0.9375 seconds in length, and that it is during minute 1 that the various line conditions are simulated. As will be seen, a valid outgoing call is established at the end of the first minute and persists for the remaining duration of minutes 2 through 16, then cyclically repeating. If desired, an additional program could be placed in minute 16 which also has 64 discrete intervals although no variations in simulated program are shown for that minute in either FIG. 15A or FIG. 15B. FIG. 15B shows a somewhat different program laid out for a sleeve and meter or sleeve only exchange.

Steps 0 to 6 of minute 1 in FIG. 15A show both the OH and REV signals to be zeros so that an on-hook condition is simulated during this interval. Steps 7 to 12 show an outgoing call in which the OH signal arises and persists for approximately five and one half seconds which is more than long enough to have obtained a valid off-hook verification, however the REV signal exists only during steps 9 and 10 or less than two seconds which is not long enough to designate a valid line reversal so that no peg or usage data will be incremented. Steps 14 to 17 indicate an incoming call because both the OH and REV signals went to the 1 state simultaneously, and since FIG. 15A is being discussed in connection with All Originating Answered calls, this data will be disregarded by the circuits looking for such calls. It would not however be disregarded by the circuits which are looking for incoming calls. Steps 19 to 22 and 28 to 33 also indicate incoming calls and will be treated in the same fashion, while step 18 and steps 23 to 27 show reversed on-hook conditions.

Step 58 denotes the beginning of an off-hook line condition which needs to persist for only six machine scans in order to be validated, corresponding to a time interval of 450 milliseconds or less than a single complete step of the program. Consequently at the beginning of step 59 when the REV signal goes to the one state, a valid off-hook had already been recorded and if a valid REV condition is detected this will correspond to a valid Originating Answered call and a peg count will be incremented and usage count commenced. A valid reversal condition occurs when the REV signal has persisted for approximately four and one half seconds which corresponds to something less than five steps of the program. Accordingly, sometime during step 63 a valid reversal condition is verified and a peg signal is generated and usage counting is commenced.

The occurrence of this condition is shown in FIG. 14A where it is observed that just prior to the end of test program minute 1 a Test Peg signal appears, and this signal is shortly thereafter followed by the beginning of the Test Usage pulse sequence. The true time relationship of the Test Peg, Test Usage and trailing edge of the 60 SEC. signal are shown in FIG. 14B which is an expansion in scale of the timed region shown in the phantom outline designated as 14B in FIG. 14A. It should be noted from FIG. 14A that as denoted by the program of FIG. 15A, only one Test Peg signal is generated during the 16 minute program interval, and that one Test Usage and one 60 SEC. signal are each generated during every test program minute. The Test Usage signal is not an actual usage count signal but is an enabling signal for gates 10-24 and 10-25 in FIG. 10B, to which figure attention should be now directed.

When the test peg signal comes up at the end of program minute 1, it sets a count into the Master Peg Register 10-21, resets the Minute Counter 10-19 to a zero count, and restores the flip-flop 10-22 so that its Q output subsides, thereby removing the inhibit from and-gate 10-24 and closing and-gate 10-25. The Test Usage signal which comes up immediately after the Test Peg, passes through the gate 10-24 to enable Initial Period Comparator 10-16. The trailing edge of the 60 SEC. signal which arrives subsequently places a 1 count into Minute Counter 10-19. Of course, at the same time that the Test Peg signal was generated, the simulated TS output signal was presented to the Input Scan Multiplexers and was processed therethrough to place a peg count in the first test address memory location. Accordingly, the count in the Master Peg Register 10-21 will be the same as the count which is now in all of the check registers in the memories provided that no processing errors have occurred.

Successive 60 SEC. pulses are received at the Minute Counter 10-19 until a match occurs with the period selection set into the Comparator 10-16 by the Selector 10-15, at which time the match M output signal is generated by Comparator 10-16 which passes through or-gate 10-20 to reset the Minute Counter 10-19 to 0 and to set flip-flop 10-22 so that its Q output arises thereby inhibiting and-gate 10-24 and enabling and-gate 10-25 so that subsequent Test Usage pulses will now pass to the Overtime Units Comparator 10-18 and not to the Initial Period Comparator 10-16. The Overtime Units Period Selector 10-17 is of course set to the same time interval as that which had been set for the Overtime Units Period Selection device 5-44 in FIG. 5B so that a usage match output obtained from Overtime Units Comparator 10-18 to thereby set a usage count into Master Usage Register 10-23 occurs at the same time as usage counts are incremented into the check register memory locations. Since the call simulator program is 16 minutes long all of the memory check registers will accumulate one peg count during that interval and a number of usage counts dependent upon the period selection which has been made for the overtime units usage counting. As shown in FIGS. 15A and 15B the call is terminated at the end of the 16 minute program, or actually rather at the beginning of the minute 1 interval of the following identical 16 minute program.

The comparisons between the data in the Master Peg Register 10-21 and the memory locations corresponding to the check registers are, as previously pointed out, made in the Peg Data Comparison Comparator 10-26, but only at those times when a GM enabling signal is present, which has previously been shown to occur only for those memory addresses which correspond to check registers. The same procedure is carried out for the master usage register comparison.

PROGRAM CALL SIMULATOR - FIG. 11

The 128 step Program Call Simulator 10-1 logic circuitry is shown in FIG. 11. When the apparatus is turned on or a transfer occurs, a signal is passed through or-gate 11-1 to divide by 50 Counter 11-2, divide by 2 Counter 11-3, Binary Counter 11-4 and Minutes Counter 11-5. Counter 11-4 is jammed to a 15 count output state and these outputs are directed to and-gate 11-6 together with the output of and-gate 11-7 which passes a signal because Minutes Counter 11-5 has been jammed to a 14 count. Since the $2^0$ output of the Counter 11-5 is not present, there is no inhibit from that signal line placed on and-gate 11-6. Additionally, the initializing signals have jammed the dividing Counters 11-2 and 11-3 to their 1 states so that the outputs of these counters are also present on and-gate 11-6 causing a SYNCH signal to be passed therethrough to synchronize the Check Register Timing Generator 10-3 shown on FIG. 10A The 15 count out of Binary Counter 11-4 is presented at the A inputs to Read Only Memory 11-8 but causes no output at the B outputs because although an enable signal is present on ROM 11-8 from and-gate 11-7, there is no enabling A4 input from the Minutes Binary Counter 11-5. When now the next TC clock signal occurs, it clears Counters 11-2 and 11-3 back to 0 counts and increments the count in Binary Counter 11-4, setting it to 0 and causing a count input to Minutes Binary Counter 11-5 which changes its count to 15 thereby maintaining the Enable signal into ROM 11-8 from and-gate 11-7, but now also placing an input into the A4 input of ROM 11-8. And-gate 11-6 is at this point disabled and another SYNCH signal will not appear until the next 16 minute program.

The 0 counts into all of the A0, A1, A2 and A3 inputs of ROM 11-8 cause a particular set of B0 through B7 outputs to appear and to be routed to the inputs of Dual Multiplexer 11-9. The B0, B1, B2 and B3 outputs from ROM 11-8 drive the C0, C1, C2 and C3 inputs of Dual Multiplexer 11-9 which control the C output of the multiplexer that generates the OH signal. Similarly, the B4 through B7 outputs of ROM 11-8 drive the D0 through D3 inputs of Multiplexer 11-9 which give rise to the D or REV signal outputs of the multiplexer. The $2^0$ and $2^1$ inputs of the Dual Multiplexer 11-9 come from the Dividing Counters 11-2 and 11-3 and produce four different input patterns as shown by the combination of waveforms above the output lines of the dividing counters. During the first interval when both waveforms are low, a 00 input condition to the Multiplexer 11-9 exists which causes the C0 and D0 multiplexer inputs to be respectively read out as the OH and REV signals. When the output of Dividing Counter 11-2 goes high, the input to the Dual Multiplexer becomes a 10 pattern causing the C1 and D1 multiplexer inputs to be read out through the C and D OH and REV signal lines of the multiplexer. Similarly for the next 2 conditions causing lease outs of the C2 D2 and C3 D3 signal pairs.

Since the TC signal occurs once each one half machine scan time, the output of Dividing Counter 11-2 occurs once each 25 scans and the output of Dividing Counter 11-3 occurs once each 50 scans. As each count comes into the Binary Counter 11-4 the counter changes its output states and causes the ROM 11-8 to change its output code routed to the Dual Multiplexer 11-9 and generates the changing pattern as for example shown in the waveforms of FIGS. 15A and 15B. When the Binary Counter 11-4 has a 15 count stored in it and the next TC input comes along, stepping it to 16 or back to 0 count, the shift of the $2^3$ output line of the binary counter from a 1 to a 0 state places a count into Minutes Counter 11-5 and changes its counts to 0 thereby suppressing the A4 and Enable signals into ROM 11-8 and jamming the ROM outputs to all ones.

These conditions remain the same for the next 15 minutes, and at the beginning of minute 15 the entire sequence repeats which occurred during the first minute. That is, another 64 step sequence is generated, but the program may be any program which has been set into the ROM 11-8. In the illustrated case it is shown to be in fact the same program as was carried on during minutes 2 through 15.

CHECK REGISTER ADDRESS TABLE - FIG. 13, TABLE 3

The logic of the Check Register Address Table 10-4 of FIG. 10A is shown in FIG. 13 where it is observed that the match signal M from the Address Comparator 10-5 and the C3 timing signal which together are passed through and-gate 10-6, as shown also in FIG. 10A, are applied to the count inputs of 4 bit BCD Counter 13-1 and 5 bit Binary Counter 13-2. The previous C4 pulse, which occurs once for each bank select signal, had previously been applied to Counters 13-1 and 13-2 to clear their counts to 0 and to cause the count corresponding to the bank select signal to be gated into the BCD Counter 13-1. From the timing waveform diagram of FIG. 7 it will be observed that the combination of T1, T2 and T4 signals are what generate the bank select signals.

From Table 3 it will be observed that the least significant digit of the first check register in each bank is identically the same as the bank select number, that is, the least significant digit of the first register in Bank 0 is in fact 0, the least significant digit in the first check register in Bank 2 is 2, and so on. Therefore, by jamming into the BCD Counter 13-1 the bank select number, the units address of the first check register in that bank is automatically established in the counter.

After a match has occurred and the next check register of that bank is to be looked for, it will be observed that the match signal M coming through and-gate 10-6 increments the count in the Counter 13-1 to step it to the next number. Accordingly, if the T1, T2 and T4 signals were previously designating the first check register in Bank 0, the initial count in Counter 13-1 would have been 0, and the incremented count caused by the M match signal steps that count to a count of 1. It will be observed that the Scanner Interface Card Number 1 check register 0051, which is the second check register in Bank 0 has as its units designation the number 1. Similarly, if the T1, T2 and T4 signals were at that time designating Bank 3, the first count jammed into Counter 13-1 would have

TABLE 3

| INTERFACE SCANNER BOARD NO. | HUNDREDS DIGIT BOARD ENABLE | TENS DIGIT ROW ENABLE | UNITS DIGIT COLUMN OUTPUT BANK φ 1 2 3 4 5 6 7 | CHECK REGISTER MEMORY ADDRESSES BANK | | | | | | | |
|---|---|---|---|---|---|---|---|---|---|---|---|
| | | | | φ | 1 | 2 | 3 | 4 | 5 | 6 | 7 |
| 0 | 0 | 0 | 0 1 2 3 4 5 6 7 | 0000 | 1001 | 2002 | 3003 | 4004 | 5005 | 6006 | 7007 |
| 1 | | 5 | 1 2 3 4 5 6 7 8 | 0051 | 1052 | 2053 | 3054 | 4055 | 5056 | 6057 | 7058 |
| 2 | 1 | 1 | 2 3 4 5 6 7 8 9 | 0112 | 1113 | 2114 | 3115 | 4116 | 5117 | 6118 | 7119 |
| 3 | | 6 | 3 4 5 6 7 8 9 0 | 0163 | 1164 | 2165 | 3166 | 4167 | 5168 | 6169 | 7160 |
| 4 | 2 | 2 | 4 5 6 7 8 9 0 1 | 0224 | 1225 | 2226 | 3227 | 4228 | 5229 | 6220 | 7221 |
| 5 | | 7 | 5 6 7 8 9 0 1 2 | 0275 | 1276 | 2277 | 3278 | 4279 | 5270 | 6271 | 7272 |
| 6 | 3 | 3 | 6 7 8 9 0 1 2 3 | 0336 | 1337 | 2338 | 3339 | 4330 | 5331 | 6332 | 7333 |
| 7 | | 8 | 7 8 9 0 1 2 3 4 | 0387 | 1388 | 2389 | 3380 | 4381 | 5382 | 6383 | 7384 |
| 8 | 4 | 4 | 8 9 0 1 2 3 4 5 | 0448 | 1449 | 2440 | 3441 | 4442 | 5443 | 6444 | 7445 |
| 9 | | 9 | 9 0 1 2 3 4 5 6 | 0499 | 1490 | 2491 | 3492 | 4493 | 5494 | 6495 | 7496 |
| 10 | 5 | 4 | 0 1 2 3 4 5 6 7 | 0540 | 1541 | 2542 | 3543 | 4544 | 5545 | 6546 | 7547 |
| 11 | | 9 | 1 2 3 4 5 6 7 8 | 0591 | 1592 | 2593 | 3594 | 4595 | 5596 | 6597 | 7598 |
| 12 | 6 | 3 | 2 3 4 5 6 7 8 9 | 0632 | 1633 | 2634 | 3635 | 436 | 5637 | 6638 | 7639 |
| 13 | | 8 | 3 4 5 6 7 8 9 0 | 0683 | 1684 | 2685 | 3686 | 4687 | 5688 | 6689 | 7680 |
| 14 | 7 | 2 | 4 5 6 7 8 9 0 1 | 0724 | 1725 | 2726 | 3727 | 4728 | 5729 | 6720 | 7721 |
| 15 | | 7 | 5 6 7 8 9 0 1 2 | 0775 | 1776 | 2777 | 3778 | 4779 | 5770 | 6771 | 7772 |
| 16 | 8 | 1 | 6 7 8 9 0 1 2 3 | 0816 | 1817 | 2818 | 3819 | 4810 | 5811 | 6812 | 7813 |
| 17 | | 6 | 7 8 9 0 1 2 3 4 | 0867 | 1868 | 2869 | 3860 | 4861 | 5862 | 6863 | 7864 |
| 18 | 9 | 0 | 8 9 0 1 2 3 4 5 | 0908 | 1909 | 2900 | 3901 | 4902 | 5903 | 6904 | 7905 |
| 19 | | 5 | 9 0 1 2 3 4 5 6 | 0959 | 1950 | 2951 | 3952 | 4953 | 5954 | 6955 | 7956 | been a 3 count corresponding to the first check register in Bank 3. The match signal M would then step the count to 4 to designate the second check register in Bank 3, and this is seen to correspond to Interface Scanner Card Number 1 for bank 3.

Since for any given interference bank, the thousands address is the same number as the bank number for all register positions, no information is contained therein and the thousands address is not examined for.

Considering now the tens and hundreds addresses of the check registers, examination of Table 3 discloses that the pair of digits designating the tens and hundreds address locations for the same interface scanner card numbers are the same. That is, the hundreds and tens digits, read in that order, for all Interface Scanner Cards Number 1 are seen to be 05 for all of the interface banks; for Interface Scanner Card Number 2 these digits are seen to be 11; for Interface Scanner Card Number 7 the digits are 38, and so on for all of the interface card numbers. This being so, it will be observed that there are a total of 20 pairs of digits which will specify the hundreds and tens digits of all of the interface scanner cards.

Accordingly, only 20 combinations need be provided, and these 20 address digits are in fact stored in the 8 by 20 Programmable Read Only Memory 13-3.

Four of each 8 bits represent the binary coded tens address and the other four of the 8 bits represent the binary coded hundreds address, the 20 discrete combinations being set into the Memory 13-3 and sequentially stepped out as the incrementing count at the inputs of the ROM 13-3 which change in accordance with the changing count in the Binary Counter 13-2. Since a count of 20 is required to step the ROM 13-3 through its program, a 5 bit counter is required as Binary Counter 13-2. The C4 clock signal comes up once each bank time and resets the Counters 13-1 and 13-2 to their initial condition states.

ERROR CHECKING - TABLE 3, FIG. 3

The error checking portion of the apparatus according to the invention not only gives an indication that an error has occurred in some memory location of a given bank, referred to as a check register because it is the memory location into which the test signals TS cause processed data to be stored, but also provides the actual data stored in each check register location together with the data which is supposed to be stored in such location. Accordingly, when a read-out of the contents of a memory is carried out, either locally or by means of a downstream interrogating source such as a CPU, the data which has been read-out enables a very rapid diagnostic routine to be run to pin-point any malfunctions in the equipment. For example, it is possible to determine that a particular row enable signal or board enable signal has been lost or is functioning erratically, that there is a problem in a particular memory bank, that a status encoder is malfunctioning, or that one of the parallel to serial multiplexers has developed a problem, that an interface board is malfunctioning or that the program call simulators or waveform simulators are the source of the error condition, or that numerous other malfunctions have occurred.

The foregoing information is all derivable by consideration of which of the check registers contain the errors. Table 3, previously referred to, shows all of the check register memory addresses for a full terminal of eight banks, the check registers for each interface bank being shown in separate columns designated 0 through 7. Additionally, to the left of the check register memory addresses are four other data columns which respectively show for each of the check registers which interface board contains it, which board enable and row enable signals control it, and which status encoder column it reads out into. The board enable, row enable and column data is derivable directly from the check register memory address, and this can be seen most easily by referring also to FIG. 3 in conjunction with Table 3.

The units digit of each check register memory address designates the column output line which carries the data for that memory location from the input interface bank. For example, in Interface Bank 0, the Column 0 output line carries the information from check register memory addresses 0000 and 0540, and this is shown in Table 3. Reference to the showing of Board 18 on FIG. 3 shows that all of the waveform converter outputs which are connected to Column 0 line do indeed have their units digit as a 0. Similarly, all of the Column 3 outputs have their units digit as the number 3, and so on.

The tens digit of each check register memory address identifies the row enable signal. Again referring to FIG. 3, it is observed that the Row Enable 0 signal enabled all of the waveform converters from 900 to 909, and of course the tens digit of these converters is 0, and similarly for the Row Enable 1 signal and so on. The hundreds digit of each register memory location denotes the board enable signal for the waveform converters which correspond to those memory locations. That is, the Board Enable 0 signal denotes the hundreds digit for the waveform converters between 0 and 99, the Board Enable 1 signal denotes the hundreds digit for the waveform converters 100 through 199, and as seen in FIG. 3 again, the Board Enable 9 signal enables the waveform converters 900 through 999.

The foregoing discussed system of check register memory address identification provides a means for comparing the error status of specific check register memory locations to identify specific kinds of errors which might occur. For example, if errors occur in the data stored in both check register memory locations gated by the same row enable signal, then the probability is high that there is something wrong in the generation or transmission o the particular row enable signal. For example, if in Bank 0 check register errors occur in registers 0000 and 0908, then there is a substantial likelihood that there is some problem with the Row Enable 0 signal. Similarly, if errors occur in both check register 0387 and 0683, then the likelihood is that there is a malfunction with the Row Enable 8 signal.

If further verification is desired, a different memory bank can be interrogated to see if the same row enable memory locations are in error. For example, Memory Bank 4 could be interrogated to check whether or not errors are shown to exist in check registers 4004 and 4902 with respect to Row Enable 0 signal, and register locations 4381 and 4687 with respect Row Enable 8 problems. If the error condition is shown to exist for the same row enable signal in two different interface banks, this is fairly conclusive of a malfunction in the row enable signal circuitry. If verification is not obtained, then the malfunction is probably associated with the particular interface board or boards. If, on the other hand, an error occurs only in a single check register memory location, then the malfunction is necessarily in the interface board.

If errors occur in the data stored in both check register memory locations gated by the same board enable signal then the probability is that something is wrong in the generation or transmission of the board enable signal. For example, for Bank 0, if errors occurs in both check registers 0000 and 0051, then the probability is that there is a malfunction in the Board Enable 0 signal circuitry, and so forth for the other board enable signals. A similar verification procedure can be carried out if desired by checking for errors in the comparable check register addresses of other interface banks. For example, Interface Bank 5 might be checked to see whether or not errors appear in check register locations 5005 and 5056. Again, if the error appears in only a single check register memory address it would indicate a malfunction in that particular interface board.

If each interface bank is provided with its own Program Call Simulator and Waveform Simulators, and if all check registers of that single bank show errors, then the malfunction is on the one hand either in the Program Call Simulaor or in the Waveform Simulator, or on the other hand is in the Memory Bank. If all of the interface banks use a common Program Call Simulator, then if the errors appear in one bank only, the malfunction is in that memory bank. On the other hand if the errors appear in all banks, then the malfunction is either in the Program Call Simulator or in the peg and usage update circuitry.

If all of the check register memory locations in a single column output are in error then, a malfunction is occurring in either the associated Status Encoder which is driven by that column output, or in the Parallel to Serial Multiplexer which receives its input from the Status Encoder fed by that column output. In order to determine whether or not the malfunction is in the Status Encoder or in the multiplexer, it is only necessary to examine some other interface bank data for the same column, as for example examining Column 3 in Banks 1 and 5 which would of course be check register memory locations 1113 and 1633 in Bank 1 and register 5443 and 5903 in Bank 5. If the column data is in error in both banks, then the malfunction is in the multiplexer. On the other hand, if the column data is in error for only one of the banks then the malfunction is in the particular Status Encoder for that particular bank which is driven by the Column 3 Waveform Converter outputs.

The running of the aforedescribed checking routines is a very simple matter for a CPU, and such checking can be sone very quickly to provide rapid and accurate trouble shooting diagnosis. If the telephone exchange is large enough to be attended, the maintenance can be carried out immediately on the spot. On the other hand, if the exchange is a smaller unattended station, a minimum of time is lost in dispatching personnel to the exchange with specific knowledge as to what requires repair. In either case of course, standby terminal equipment may be provided, which upon the generation of an error alarm, is automatically switched into use in place of the terminal in which the error alarm has been generated. In this manner, substantially no inaccurate data is accumulated, and after repair, the standby unit may be switched back off of the lines.

In any event, because the terminals may be interrogated at fairly frequent intervals it is always possible to determine when the last accurate data had been received, and to adjust billings accordingly. However, because the apparatus pinpoints the portions of the equipment which have errors, the information in the other memory locations of the equipment may be considered accurate, and only a limited amount of data need be discarded. In fact, consideration of the various kinds of errors which can occur, as previously discussed, discloses that there will be many cases where even though errors occur, the data need not be discarded, because for billing purposes the nature of the errors are such that they would not be prejudicial to the subscriber.

Having now described our invention in connection with a particularly illustrated embodiment thereof, it will be appreciated that modifications and variations of our invention may now occur from time to time to those persons normally skilled in the art without departing from the essential scope or spirit of our invention, and accordingly it is intended to claim the same broadly as well as specifically as indicated by the appended claims.

What is claimed to be new and useful is:

1. Event monitoring apparatus for coupling to and automatically examining at cyclically repeating time intervals the signal conditions on a signal circuit comprising, a. signals receiving monitor means for determining that particular kinds of circuit conditions have occurred on said signal circuit and operative to generate a first data signal upon such occurrences,
   b. timing means including first means for determining the duration of the occurrence of said particular kinds of signal conditions commencing with the end of a predetermined time period after said monitor means has determined that one of said particular kinds of signal condition has occurred and operative to generate a second data signal denoting the time duration of the aforesaid particular kind of signal condition.

2. Apparatus as set forth in claim 1 wherein said monitor means simultaneously detects the occurrence of a first type of signal and the absence of a second type of signal, and also includes means for determining that said first type of signal has persisted for a first predetermined time duration.

3. Apparatus as set forth in claim 1 wherein said signals receiving monitor means is operatively coupled to and receives signals from signal encoding means operative to distinguish between a plurality of signal sequence conditions on the signal circuit and to generate a plurality of output signal sequences which each discretely indicates the occurrence of a particular circuit signal sequence and the duration of the component signals of that sequence.

4. Apparatus as set forth in claim 1 wherein said timing means includes second means effective to set as desired the duration of said predetermined time period.

5. Apparatus as set forth in claim 1 wherein said timing means includes second means effective to set said predetermined time period to zero and thereby cause said first means to determine the duration of the occurrence of said particular kind of signal condition commencing immediately after said monitor means has determined that said particular kind of signal condition has occurred.

6. Apparatus as set forth in claim 1 wherein said monitor means includes means for coupling to and cyclically selectively singly sequentially examining the signal conditions on each of a multiplicity of independent monitored signal circuits.

7. Apparatus as set forth in claim 1 further including,
   a. data signals storage means effective to store said first and second data signals from said monitored signal circuit,
   b. event incrementing means coupled to said monitor means and to said data signals storage means effective to increment the stored data signals for said monitored signal circuit in accordance with the generation of said first and second data signals,
   c. test-signals-generating signal circuit means monitored by said monitor means and operative to generate a predetermined particular signal condition suitable for processing by said monitor and timing means and storage in said data signals storage means,
   d. test signals storage means operative to store test signals occurrence and duration signals, and
   e. comparator means coupled to and receiving test signals and data signals respectively from said test signals storage means and said data signals storage means, said comparator being operative, effective responsive to detection of a difference between said test signals and data signals, to generate an error alarm signal.

8. Apparatus as set forth in claim 1 further including
   a. parallel to serial electrical signal input multiplexer means and encoder means, said multiplexer means having an output circuit and a plurality of independent input circuits, each said input circuit being cyclically selectively singly sequentially operatively coupled to said output circuit through said encoder means for a predetermined time interval to thereby deliver to said output circuit a sequence of encoded electrical signals corresponding to the signal condition on each of said input circuits during the time interval that the particular selected input circuit is coupled to the said output circuit, said output circuit being coupled to said monitor means,
   b. data signals storage means effective to store said first and second data signals from each monitored signal circuit,
   c. event incrementing means coupled to said monitor means and to said data signals storage means effective to increment the stored data signals for each monitored signal circuit in accordance with the generation of said first and second data signals,
   d. test-signals-generating means coupled to a plurality of selected ones of said plurality of independent input circuits monitored by said monitor means, and operative to generate a predetermined particular signal condition suitable for processing by said monitor and timing means and storage in said data signals storage means at storage locations corresponding to the input multiplexer input circuit address,
   e. test signals storage means operative to store test signals occurrence and duration signals,
   f. first comparator means coupled to and receiving test signals and data signals respectively from said test signals storage means and said data signals storage means, said first comparator being operative when enabled, and effective responsive to detection of a difference between said test signals and data signals, to generate an error alarm signal, and
   g. test signals input circuits address storage means which stores the input circuit addresses to which said test-signals generating means is coupled, and second comparator means for comparing the instantaneous address of the input circuit then coupled to said monitor means with the addresses stored in said test signals circuits address storage means, said second comparator means generating an enabling signal rendering operative said first comparator means when an address match occurs.

9. Apparatus as set forth in claim 1 wherein said signals receiving monitor means is operatively coupled to and receives signals from signal encoding means which generate for said signal circuit a discrete pair of binary coded first and second status signals in accordance with the particular circuit conditions then existing, said binary coded circuit status signals having four discrete coded combinations interpretable by said monitor means, said coded combinations being 00, 10, 01, 11.

10. Apparatus as set forth in claim 2 wherein said signals receiving monitor means is operatively coupled to and receives signals from signal encoding means which generate for said signal circuit a discrete pair of binary coded first and second status signals in accordance with the particular circuit conditions then existing, said binary coded circuit status signals having four discrete coded combinations interpretable by said monitor means, said coded combinations being 00, 10, 01, 11.

11. Apparatus as set forth in claim 2 wherein said monitor means includes means for remembering the presence and duration of said first type of signal and thereafter detects the occurrence of said second type of signal, and also includes means for determining that said second type of signal has persisted for a second predetermined time duration.

12. Apparatus as set forth in claim 2 wherein said timing means includes second means effective to set as desired the duration of said predetermined time period.

13. Apparatus as set forth in claim 2 wherein said timing means includes second means effective to set said predetermined time period to zero and thereby cause said first means to determine the duration of the occurrence of said particular kind of signal condition commencing immediately after said monitor means has determined that said particular kind of signal condition has occurred.

14. Apparatus as set forth in claim 2 wherein said monitor means includes means for coupling to and cyclically selectively singly sequentially examining the signal conditions on each of a multiplicity of independent monitored signal circuits.

15. Apparatus as set forth in claim 2 further including,
   a. data signals storage means effective to store said first and second data signals from said monitored signal circuit,
   b. event incrementing means coupled to said monitor means and to said data signals storage means effective to increment the stored data signals for said monitored signal circuit in accordance with the generation of said first and second data signals,
   c. test-signals-generating signal circuit means monitored by said monitor means and operative to generate a predetermined particular signal condition suitable for processing by said monitor and timing means and storage in said data signals storage means,
   d. test signals storage means operative to store test signals occurrence and duration signals, and
   e. comparator means coupled to and receiving test signals and data signals respectively from said test signals storage means and said data signals storage means, said comparator being operative, effective responsive to detection of a difference between said test signals and data signals, to generate an error alarm signal.

16. Apparatus as set forth in claim 2 further including
   a. parallel to serial electrical signal input multiplexer means and encoder means, said multiplexer means having an output circuit and a plurality of independent input circuits, each said input circuit being cyclically selectively singly sequentially operatively coupled to said output circuit through said encoder means for a predetermined time interval to thereby deliver to said output circuit a sequence of encoded electrical signals corresponding to the signal condition on each of said input circuits during the time interval that the particular selected input circuit is coupled to the said output circuit, said output circuit being coupled to said monitor means,
   b. data signals storage means effective to store said first and second data signals from each monitored signal circuit, c. event incrementing means coupled to said monitor means and to said data signals storage means effective to increment the stored data signals from each monitored signal circuit in accordance with the generation of said first and second data signals, d. test-signals-generating means coupled to a plurality of selected ones of said plurality of independent input circuits monitored by said monitor means, and operative to generate a predetermined particular signal condition suitable for processing by said monitor and timing means and storage in said data signals storage means at storage locations corresponding to the input multiplexer input circuit address, e. test signals storage means operative to store test signals occurrence and duration signals, f. first comparator means coupled to and receiving test signals and data signals respectively from said test signals storage means and said data signals storage means, said first comparator being operative when enabled, and effective responsive to detection of a difference between said test signals and data signals, to generate an error alarm signal, and g. test signals input circuits address storage means which stores the input circuit addresses to which said test-signals generating means is coupled, and second comparator means for comparing the instantaneous address of the input circuit then coupled to said monitor means with the addresses stored in said test signals circuits address storage means, said second comparator means generating an enabling signal rendering operative said first comparator means when an address match occurs.

17. Apparatus as set forth in claim 3 wherein said timing means includes a second means effective to set as desired the duration of said predetermined time period.

18. Apparatus as set forth in claim 3 wherein said timing means includes second means effective to set said predetermined time period to zero and thereby cause said first means to determine the duration of the occurrence of said particular kind of signal condition commencing immediately after said monitor means has determined that said particular kind of signal condition has occurred.

19. Apparatus as set forth in claim 3 wherein said monitor means includes means for coupling to and cyclically selectively singly sequentially examining the signal conditions on each of a multiplicity of independent monitored signal circuits.

20. Apparatus as set forth in claim 3 further including, a. data signals storage means effective to store said first and second data signals from said monitored signal circuit, b. event incrementing means coupled to said monitor means and to said data signals storage means effective to increment the stored data signals for said monitored signal circuit in accordance with the generation of said first and second data signals, c. test-signals-generating signal circuit means monitored by said monitor means and operative to generate a predetermined particular signal condition suitable for processing by said monitor and timing means and storage in said data signals storage means, d. test signals storage means operative to store test signals occurrence and duration signals, and e. comparator means coupled to and receiving test signals and data signals respectively from said test signals storage means and said data signals storage means, said comparator being operative, effective responsive to detection of a difference between said test signals and data signals, to generate an error alarm signal.

21. Apparatus as set forth in claim 3 further including a. parallel to serial electrical signal input multiplexer means and encoder means, said multiplexer means having an output circuit and a plurality of independent input circuits, each said input circuit being cyclically selectively singly squentially operatively coupled to said output circuit through said encoder means for a predetermined time interval to thereby deliver to said output circuit a sequence of encoded electrical signals corresponding to the signal condition on each of said input circuits during the time interval that the particular selected input circuit is coupled to the said output circuit, said output circuit being coupled to said monitor means, b. data signals storage means effective to store said first and second data signals from each monitored signal circuit, c. event incrementing means coupled to said monitor means and to said data signals storage means effective to increment the stored data signals from each monitored signal circuit in accordance with the generation of said first and second data signals, d. test-signals-generating means coupled to a plurality of selected ones of said plurality of independent input circuits monitored by said monitor means, and operative to generate a predetermined particular signal condition suitable for processing by said monitor and timing means and storage in said data signals storage means at storage locations corresponding to the input multiplexer input circuit address, e. test signals storage means operative to store test signals occurrence and duration signals, f. first comparator means coupled to and receiving test signals and data signals respectively from said test signals storage means and said data signals storage means, said first comparator being operative when enabled, and effective responsive to detection of a difference between said test signals and data signals, to generate an error alarm signal, and g. test signals input circuits address storage means which stores the input circuit addresses to which said test-signals generating means is coupled, and second comparator means for comparing the instantaneous address of the input circuit then coupled to said monitor means with the addresses stored in said test signals circuits address storage means, said second comparator means generating an enabling signal rendering operative said first comparator means when an address match occurs.

22. Apparatus as set forth in claim 3 wherein said signals encoding means generates a discrete pair of binary coded first and second circuit status signals in accordance with the particular circuit conditions then existing, said binary coded circuit status signals having four discrete coded combinations interpretable by said monitor means, said coded combinations being 00, 10, 01, 11.

23. Apparatus as set forth in claim 3 wherein said signal encoding means includes means for simultaneously detecting the occurrence of a first type of signal and the absence of a second type of signal, and means for determining that said first type of signal has persisted for a first predetermined time duration.

24. Apparatus as set forth in claim 9 for use in monitoring the signal conditions on telephone circuits, wherein said signal encoding means generates a different one of said coded combinations for each of the telephone circuit conditions of line idle, off-hook, reversed on-hook and reversal.

25. Apparatus as set forth in claim 9 for use in monitoring the signal conditions on telephone circuits, wherein said signal encoding means generates a different one of said coded combinations for each of the telephone circuit conditions of line idle, off-hook, reversed on-hook and reversal, and wherein said monitor means comprises examining, storing and signal generating means for examining said coded combinations, noting and storing the occurrence and disappearance of specific ones of said combinations, the durations of such combinations, and the sequence in which such combinations occur, and in response to the foregoing, at appropriate times generating control signals and said first and second data signals.

26. Apparatus as set forth in claim 10 for use in monitoring the signal conditions on telephone circuits, wherein said signal encoding means generates a different one of said coded combinations for each of the telephone circuit conditions of line idle, off-hook, reversed on-hook and reversal.

27. Apparatus as set forth in claim 10 for use in monitoring the signal conditions on telephone circuits, wherein said signal encoding means generates a different one of said coded combinations for each of the telephone circuit conditions of line idle, off-hook, reversed on-hook and reversal, and wherein said monitor means comprises examining, storing and signal generating means for examining said coded combinations, noting and storing the occurrence and disappearance of specific ones of said combinations, the duration of such combinations, and the sequence in which such combinations occur, and in response to the foregoing, at appropriate times generating control signals and said first and second data signals.

28. Apparatus as set forth in claim 16 wherein said timing means includes second means effective to set as desired the duration of said predetermined time period.

29. Apparatus as set forth in claim 21 wherein said timing means includes second means effective to set as desired the duration of said predetermined time period.

30. Apparatus as set forth in claim 23 wherein said monitor means examining, storing and signal generating means notes and stores the occurrence and disappearance of the off-hook circuit condition, determines whether or not a valid off-hook circuit condition occurred and if so its time duration, and generates and stores first and second data signals corresponding to valid off-hook conditions.

31. Apparatus as set forth in claim 23 wherein said monitor means examining, storing and signal generating means notes and stores the occurrence and disappearance of the incoming call circuit condition, determines whether or not a valid incoming call circuit condition occurred and if so its time duration, and generates and stores first and second data signals corresponding to valid incoming call conditions.

32. Apparatus as set forth in claim 23 wherein said monitor means examining, storing and signal generating means notes and stores the occurrence of a valid off-hook condition followed by the occurrence of a valid reversal condition while the off-hook condition is maintained, notes and stores the time duration of such reversal condition, and generates and stores first and second data signals corresponding to a valid originating answered call.

33. Apparatus as set forth in claim 27 wherein said monitor means examining, storing and signal generating means notes and stores the occurrence and disappearance of the off-hook circuit condition, determines whether or not a valid off-hook circuit condition occurred and if so its time duration, and generates and stores first and second data signals corresponding to valid off-hook conditions.

34. Apparatus as set forth in claim 27 wherein said monitor means examining, storing and signal generating means notes and stores the occurrence and disappearance of the incoming call circuit condition, determines whether or not a valid incoming call circuit condition occurred and if so its time duration, and generates and stores first and second data signals corresponding to valid incoming call conditions, the occurrence of said incoming call condition being determined by recognition of a signal circuit reversal condition in the absence of a verified off-hook condition.

35. Apparatus as set forth in claim 27 wherein said monitor means examining, storing and signal generating means notes and stores the occurrence of a valid off-hook condition followed by the occurrence of a valid reversal condition while the off-hook condition is maintained, notes and stores the time duration of such reversal condition, and generates and stores first and second data signals corresponding to a valid originating answered call.

36. For use in conjunction with event monitoring apparatus of the type for coupling to and automatically examining signal conditions on signal circuits in which such event monitoring apparatus comprises,
 a. signals receiving monitor means for determining that particular kinds of circuit conditions have occurred on said signal circuits and operative to generate signal circuits data signals delineating such conditions,
 b. parallel to serial electrical signal input multiplexer means, said multiplexer means having an output circuit and a plurality of independent input circuits, each said input circuit being cyclically selectively singly sequentially operatively coupled to said output circuit for a predetermined time interval to thereby deliver to said output circuit a sequence of electrical signals corresponding to the signal condition on each of said input circuits during the time interval that the particular selected input circuit is coupled to the said output circuit, said output circuit being coupled to said monitor means,
 c. data signals storage means effective to store said signal circuits data signals from each monitored signal circuit,
 d. event incrementing means coupled to said monitor means and to said data signals storage means effective to increment the stored data signals from each monitored signal circuit in accordance with the generation of said data signals;
The invention of a data processing verifier apparatus comprising,
 a. test-signals-generating means coupled to a plurality of selected ones of said plurality of independent input circuits monitored by said monitor means, and operative to generate predetermined particular test data signal conditions suitable for processing by said monitor means and storage in said data signals storage means at storage locations corresponding to the input multiplexer input circuit address, b. test signals storage means operative to store test data signals, c. first comparator means coupled to and receiving test data signals and signal circuits data signals respectively from said test signals storage means and said data signals storage means, said first comparator means being operative when enabled, and effective responsive to detection of a difference between said test data signals and signal circuits data signals, to generate an error alarm signal, and d. test data signals input circuits address storage means which stores the input circuit addresses to which said test signals generating means is coupled, and second comparator means for comparing the instantaneous address of the input circuit then coupled to said monitor means with the addresses stored in said test signals circuits address storage means, said second comparator means generating an enabling signal rendering operative said first comparator means when an address match occurs.

37. Apparatus as set forth in claim 36 further including means to read out of said apparatus the data stored in all of said data signals storage means, said test signals storage means and said first comparator means, whereby, said data may be processed to determine the malfunction causing data processing errors by comparing the accuracy or occurrence of errors in the data read out of said data signals storage means for specific ones of said input circuits to which said test signals generating means is coupled.

38. Apparatus as set forth in claim 36 wherein said test-signals-generating means comprises a call simulator which generates in a programmed sequence a plurality of different kinds of signals corresponding to a plurality of different kinds of signal circuit conditions, different ones of said signals sequence being generated for different time durations.

39. Data processing verifier apparatus as set forth in claim 36 wherein said event monitoring apparatus with which said verifier is used further includes timing signals generating means which generates groups of a plurality of timing signals each of which groups discretely identifies a different input circuit and corresponding data location in said data signals storage means, selected ones of said timing signals being transmitted to and through said input multiplexer means to data processing verifier control means through which said enabling signal from said verifier second comparator must pass in order to enable said verifier first comparator, said selected ones of said timing signals when not present rendering said control means inoperative to pass said enabling signal.

40. Data processing verifier apparatus as set forth in claim 36 wherein said event monitoring apparatus with which said verifier is used further includes timing signals generating means which generates groups of a plurality of timing signals each of which groups discretely identifies a different input circuit and corresponding data location in said data signals storage means, selected ones of said timing signals being transmitted to and through said data signals storage means to data processing verifier control means through which said enabling signal from said verifier second comparator must pass in order to enable said verifier first comparator, said selected ones of said timing signals when not present rendering said control means inoperative to pass said enabling signal.

41. Data processing verifier apparatus as set forth in claim 36 wherein said event monitoring apparatus with which said verifier is used further includes timing signals generating means which generates groups of a plurality of timing signals each of which groups discretely identifies a different input circuit and corresponding data location in said data signals storage means, first selected ones of said timing signals being transmitted to and through said input multiplexer means to data processing verifier control means through which said enabling signal from said verifier second comparator must pass in order to enable said verifier first comparator, and second selected ones of said address signals being transmitted to and through said data signals storage means to said verifier control means, said first and second selected ones of said timing signals when not simultaneously present rendering said control means inoperative to pass said enabling signal.

42. Apparatus as set forth in claim 36 wherein said data signals storage means of said event monitoring apparatus comprises, accumulating storage means which receives the signal circuits data from said event incrementing means, and passive storage means which from time to time has transferred to it for subsequent read-out upon command the data accumulated in said accumulating storage means, and wherein said data processing verifier test signals storage means comprises accumulating test signals storage means which receives test signals event data from said test signals generating means, and passive test signals storage means which receives and holds from said accumulating test signals storage means for subsequent readout upon command the data accumulated therein whenever said event monitoring apparatus passive storage means has transferred to it the data from its associated accumulating storage means.

43. Apparatus as set forth in claim 36 wherein said data signals storage means of said event monitoring apparatus comprises, accumulating storage means which receives the signal circuits data from said event incrementing means, and passive storage means which from time to time has transferred to it for subsequent readout upon command the data accumulated in said accumulating storage means, and wherein said data processing verifier test signals storage means comprises accumulating test signals storage means which receives test signals event data from said test signals generating means, and passive test signals storage means which receives and holds from said accumulating test signals storage means for subsequent readout upon command the data accumulated therein whenever said event monitoring apparatus passive storage means has transferred to it the data from its associated accumulating storage means, and means for effecting readout from said passive test signals storage means.

44. Apparatus as set forth in claim 36 wherein said data processing verifier further includes error alarm signal storage means coupled to and receiving error alarm signals from said comparator means for subsequent readout upon command.

45. Apparatus as set forth in claim 36 wherein said data processing verifier further includes error alarm signal storage means coupled to and receiving error alarm signals from said comparator means for subsequent readout upon command, and means for effecting readout from said error alarm signal storage means.

46. Apparatus as set forth in claim 38 wherein said data signals storage means of said event monitoring apparatus comprises, accumulating storage means which receives the signal circuits data from said event incrementing means, and passive storage means which from time to time has transferred to it for subsequent readout upon command the data accumulated in said accumulating storage means, and wherein said data processing verifier test signals storage means comprises accumulating test signals storage means which receives test signals event data from said test signals generating means, and passive test signals storage means which receives and holds from said accumulating test signals storage means for subsequent readout upon command the data accumulated therein whenever said event monitoring apparatus passive storage means has transferred to it the data from its associated accumulating storage means.

47. Apparatus as set forth in claim 38 wherein said data processing verifier further includes error alarm signal storage means coupled to and receiving error alarm signals from said comparator means for subsequent readout upon command.

48. Apparatus as set forth in claim 42 wherein said data processing verifier further includes error alarm signal storage means coupled to and receiving error alarm signals from said comparator means for subsequent readout upon command.

49. Apparatus as set forth in claim 48 further including means for effecting readout from said error alarm signal storage means and from said passive test signals storage means.

50. A method of equipment malfunction detection by checking processed data, for use in conjunction with event monitoring apparatus of the type for coupling to and automatically examining signal conditions on signal circuits in which such event monitoring apparatus comprises,
   a. signals receiving monitor means for determining that particular kinds of circuit conditions have occurred on said signal circuits and operative to generate signal circuits data signals delineating such conditions,
   b. parallel to serial electrical signal input multiplexer means, said multiplexer means having an output circuit and a plurality of independent input circuits, each said input circuit being cyclically selectively singly sequentially operatively coupled to said output circuit for a predetermined time interval to thereby deliver to said output circuit a sequence of electrical signals corresponding to the signal condition on each of said input circuits during the time interval that the particular selected input circuit is coupled to the said output circuit, said output circuit being coupled to said monitor means,
   c. data signals storage means effective to store said signal circuits data signals from each monitored signal circuit,
   d. event incrementing means coupled to said monitor means and to said data signals storage means effective in increment the stored data signals for each monitored signal circuit in accordance with the generation of said data signals;

said method consisting of the steps of,
   a. generating test data signals and coupling the same to a plurality of selected ones of said plurality of independent input circuits monitored by said monitor means, said test signals consisting of predetermined particular test data signal conditions suitable for processing by said monitor means,
   b. processing said test data signals through said event monitoring apparatus and storing said processed data in said data signals storage means at storage locations corresponding to the input multiplexer input circuit address.
   c. storing said generated original test data signals,
   d. generating addresses for each of said processed data signals storage locations in which is stored processed test data signals,
   e. comparing the instantaneous address of the input circuit then coupled to said monitor means and hence the storage address of said processed data signals, for a match with the addresses of said data signals storage locations in which is stored processed test data signals, and when a match is obtained, comparing said stored processed data signal with said stored original test data signal and generating an error alarm when said data signals do not match.

51. The method as set forth in claim 50 including the further step of storing said generated error alarm.

52. The method as set forth in claim 50 including the further steps of,
   a. removing from storage said original test data signals and said processed test data signals,
   b. comparing said processed test data signals with said original test data signals and determining which input circuit addresses produced erroneous processed data,
   c. determining the equipment malfunction which caused the error by sorting and combining the error containing input circuit addresses.

53. The method as set forth in claim 51 including the steps of,
   a. examining for the occurrence of said error alarm signal and upon detection of such occurrence,
   b. comparing said processed test data signals with said original test data signals and determining which input circuit addresses produced erroneous processed data,
   c. determining the equipment malfunction which caused the error by sorting and combining the error containing input circuit addresses.

54. A method of monitoring specific discretely identifiable activity on a signal circuit to collect data from which it may be determined how often such activity is present and the time duration of such activity for such signal circuit, consisting of the steps of,
   a. examining the signal conditions on a signal circuit during a plurality of cyclically repeating sequential time intervals,
   b. detecting that a discretely identifiable type of activity has occurred,
   c. waiting a predetermined length of time after detection of occurrence of such activity, and
   d. measuring the time duration of such activity commencing with the end of said predetermined waiting time.

55. The method as set forth in claim 54 wherein the time duration of said waiting step is selectable as desired.

56. The method as set forth in claim 54 wherein said step of examining the signal conditions on the signal circuit consists of the steps of,
   a. examining for the presence of a first type of signal and the absence of a second type of signal, and
   b. detecting that the presence of the first type of signal has persisted for a first predetermined time duration.

57. The method as set forth in claim 54 wherein said step of examining the signal conditions on the signal circuit consists of the step of encoding the examined signal condition into a pair of binary coded signals having four discrete interpretable combinations.

58. The method as set forth in claim 54 wherein said step of examining the signal conditions on the signal circuit consists of the steps of,
   a. examining the signal conditions on a telephone circuit for the presence of the four discrete circuit conditions of line idle, off-hook, reversal and reversed on-hook,
   b. encoding the examined signal condition into a pair of binary coded signals having four discrete interpretable combinations, one combination for each of the four aforesaid circuit conditions.

59. The method as set forth in claim 56 further including the steps of,
   a. subsequently detecting the presence of said second type of signal and the continued presence of said first type of signal, and
   b. detecting that the presence of the second type of signal has persisted for a second predetermined time duration.

* * * * *